United States Patent
Wallentin et al.

(10) Patent No.: US 11,903,085 B2
(45) Date of Patent: Feb. 13, 2024

(54) MOBILITY MANAGEMENT FOR RELAYING

(71) Applicant: Telefonaktiebolaget LM Ericsson (publ), Stockholm (SE)

(72) Inventors: Pontus Wallentin, Linköping (SE); Mats Folke, Vällingby (SE); Patrik Rugeland, Stockholm (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 746 days.

(21) Appl. No.: 16/346,633

(22) PCT Filed: Nov. 2, 2017

(86) PCT No.: PCT/SE2017/051088
§ 371 (c)(1),
(2) Date: May 1, 2019

(87) PCT Pub. No.: WO2018/084788
PCT Pub. Date: May 11, 2018

(65) Prior Publication Data
US 2020/0068380 A1     Feb. 27, 2020

Related U.S. Application Data

(60) Provisional application No. 62/416,234, filed on Nov. 2, 2016.

(51) Int. Cl.
*H04W 8/02*    (2009.01)
*H04W 76/14*    (2018.01)
(Continued)

(52) U.S. Cl.
CPC ............ *H04W 8/02* (2013.01); *H04W 4/021* (2013.01); *H04W 8/005* (2013.01);
(Continued)

(58) Field of Classification Search
CPC ....... H04W 8/02; H04W 8/005; H04W 76/14; H04W 4/021; H04W 68/005; H04W 88/04
(Continued)

(56) References Cited

U.S. PATENT DOCUMENTS

2013/0313325 A1* 11/2013 Wilz, Sr. ............ G06K 7/10554
                                                       235/462.25
2013/0322388 A1   12/2013   Ahn et al.
(Continued)

FOREIGN PATENT DOCUMENTS

EP         2 723 143 A1    4/2014
WO    WO 2010/006649 A1    1/2010
(Continued)

OTHER PUBLICATIONS

International Search Report and Written Opinion of the International Searching Authority, PCT/SE2017/051088, dated Jan. 25, 2018, 13 pages.
(Continued)

*Primary Examiner* — Chi Tang P Cheng
(74) *Attorney, Agent, or Firm* — Sage Patent Group

(57) ABSTRACT

When a node in a cellular communications network is serving a first User Equipment, it obtains information about a second UE that may be used as a relay by the first UE. It obtains information in the event that there is data to be sent to the first UE, and sends a request to a node serving the second UE.

13 Claims, 31 Drawing Sheets

(51) Int. Cl.
*H04W 4/021* (2018.01)
*H04W 8/00* (2009.01)
*H04W 68/00* (2009.01)
*H04W 88/04* (2009.01)

(52) U.S. Cl.
CPC ......... *H04W 68/005* (2013.01); *H04W 76/14* (2018.02); *H04W 88/04* (2013.01)

(58) Field of Classification Search
USPC .......................................................... 370/315
See application file for complete search history.

(56) References Cited

U.S. PATENT DOCUMENTS

| | | | | |
|---|---|---|---|---|
| 2015/0358907 | A1* | 12/2015 | Berggren | H04W 52/0229 455/574 |
| 2017/0325270 | A1* | 11/2017 | Tenny | H04W 12/068 |
| 2018/0084523 | A1* | 3/2018 | Uchiyama | H04W 88/04 |

FOREIGN PATENT DOCUMENTS

| WO | WO 2012/102546 A2 | 8/2012 |
|---|---|---|
| WO | WO 2012/102546 A3 | 8/2012 |

OTHER PUBLICATIONS

Renesas Mobile Europe Ltd., Network connection via ProSe UE-to-Network relay, SA WG2 Meeting #98, Jul. 15-19, 2013, Valencia, Spain, S2-132706, XP050726084, Jul. 9, 2013, 3 Pages.

3GPP TS 23.303 V13.0.0 (Jun. 2015): 3rd Generation Partnership Project; Technical Specification Group Services and System Aspects; Proximity-based services (ProSe); Stage 2 (Release 13), XP055440604, Mar. 1, 2016, 97 Pages.

3GPP TS 23.303 V14.0.0 (Sep. 2016): 3rd Generation Partnership Project; Technical Specification Group Services and System Aspects; Proximity-based services (ProSe); Stage 2 (Release 14), 124 Pages.

* cited by examiner

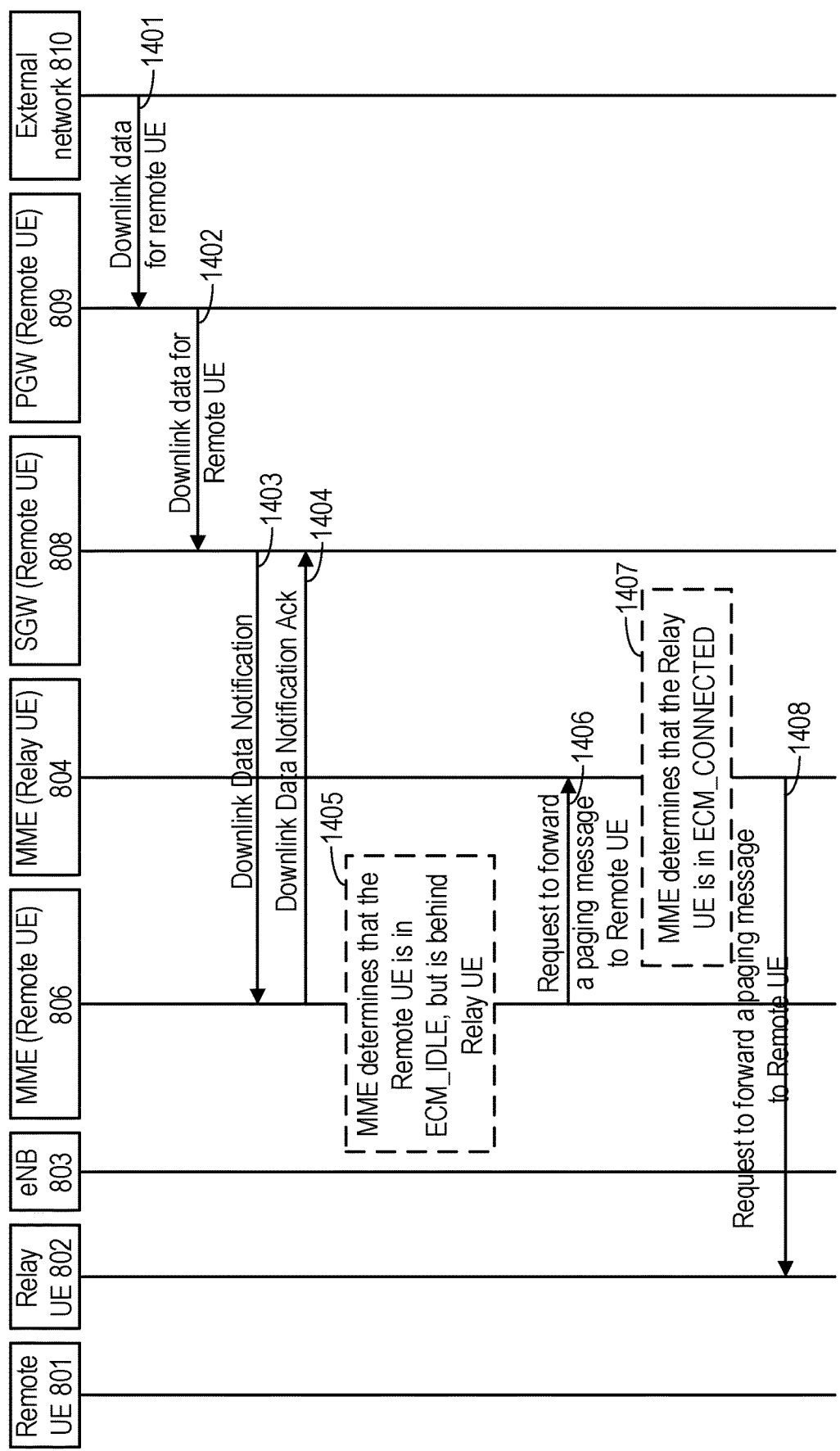
Figure 14(a)(1)

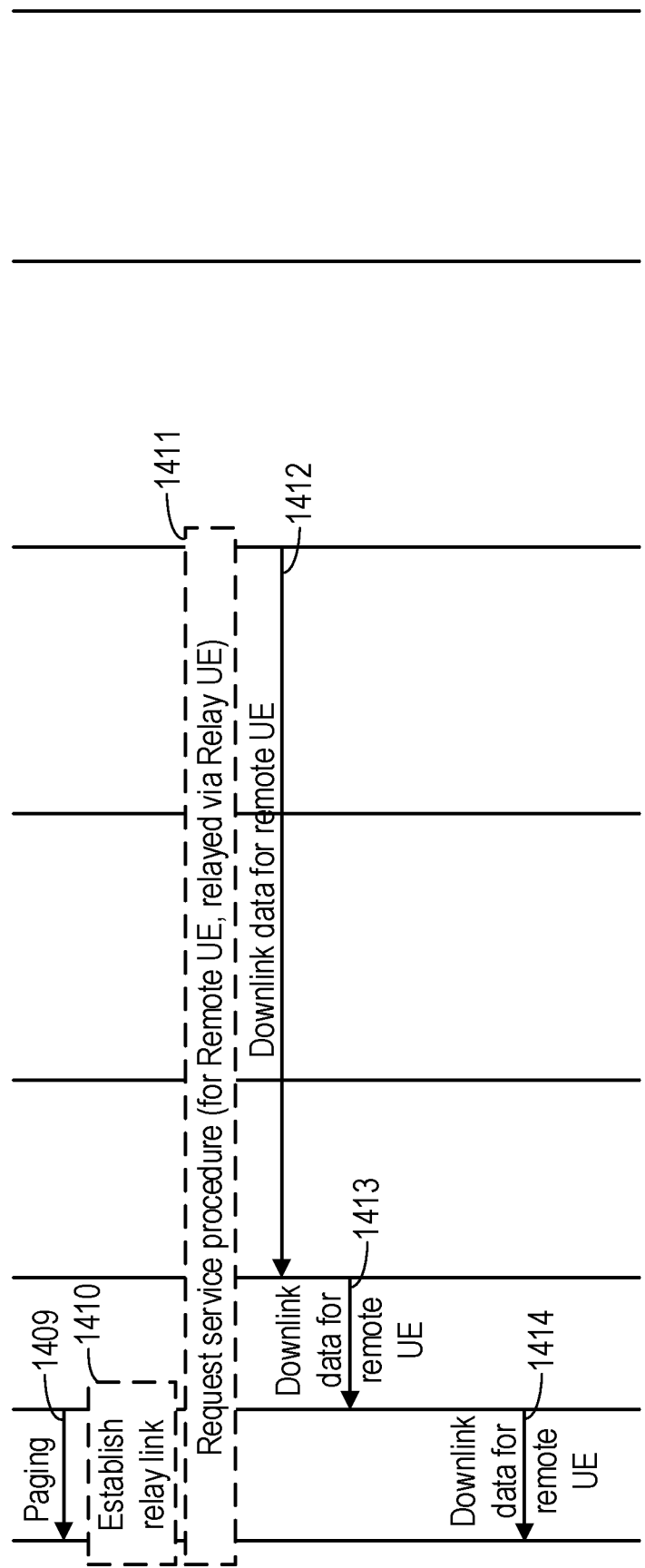
Figure 14(a)(2)

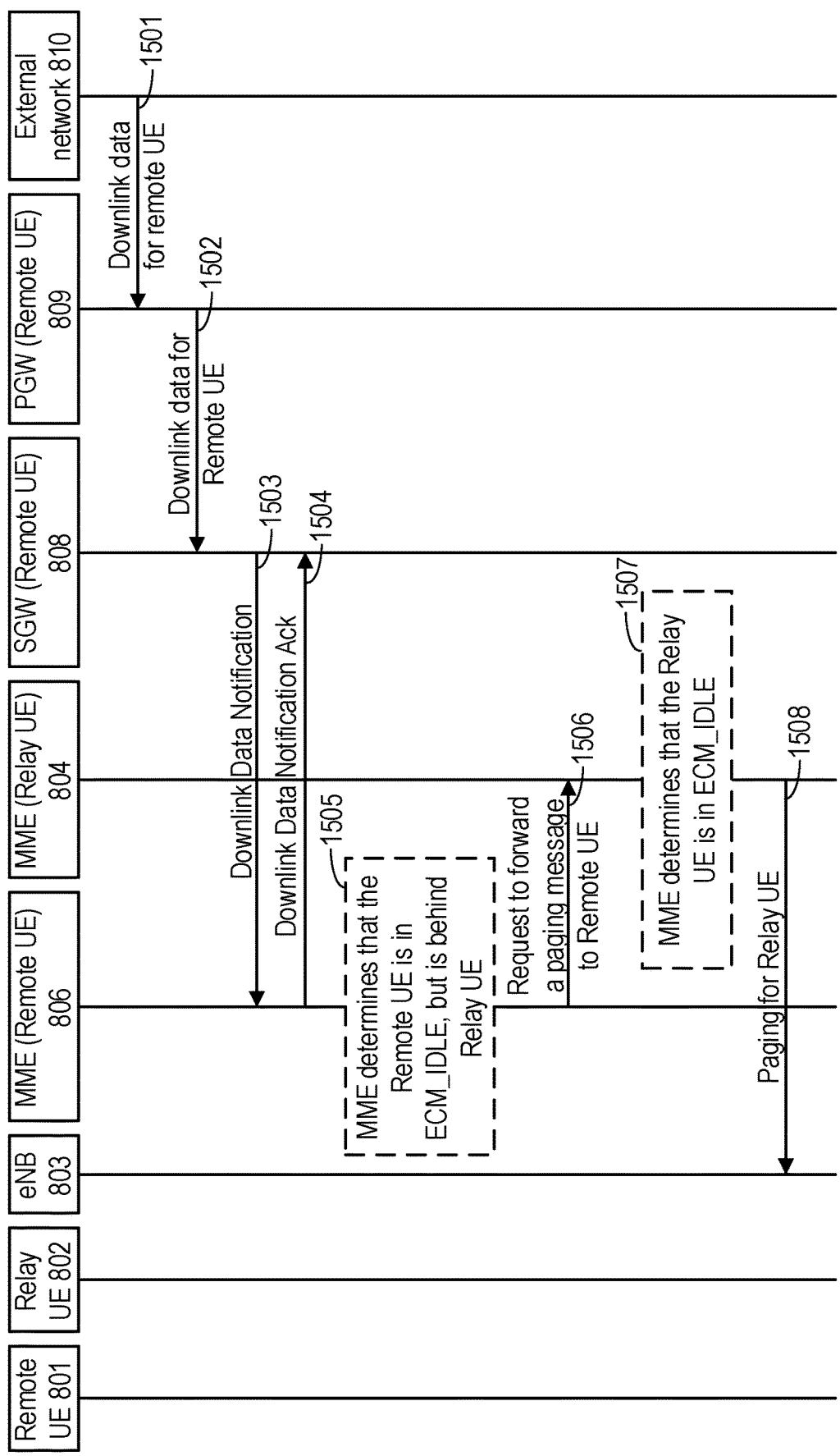
Figure 15(a)(1)

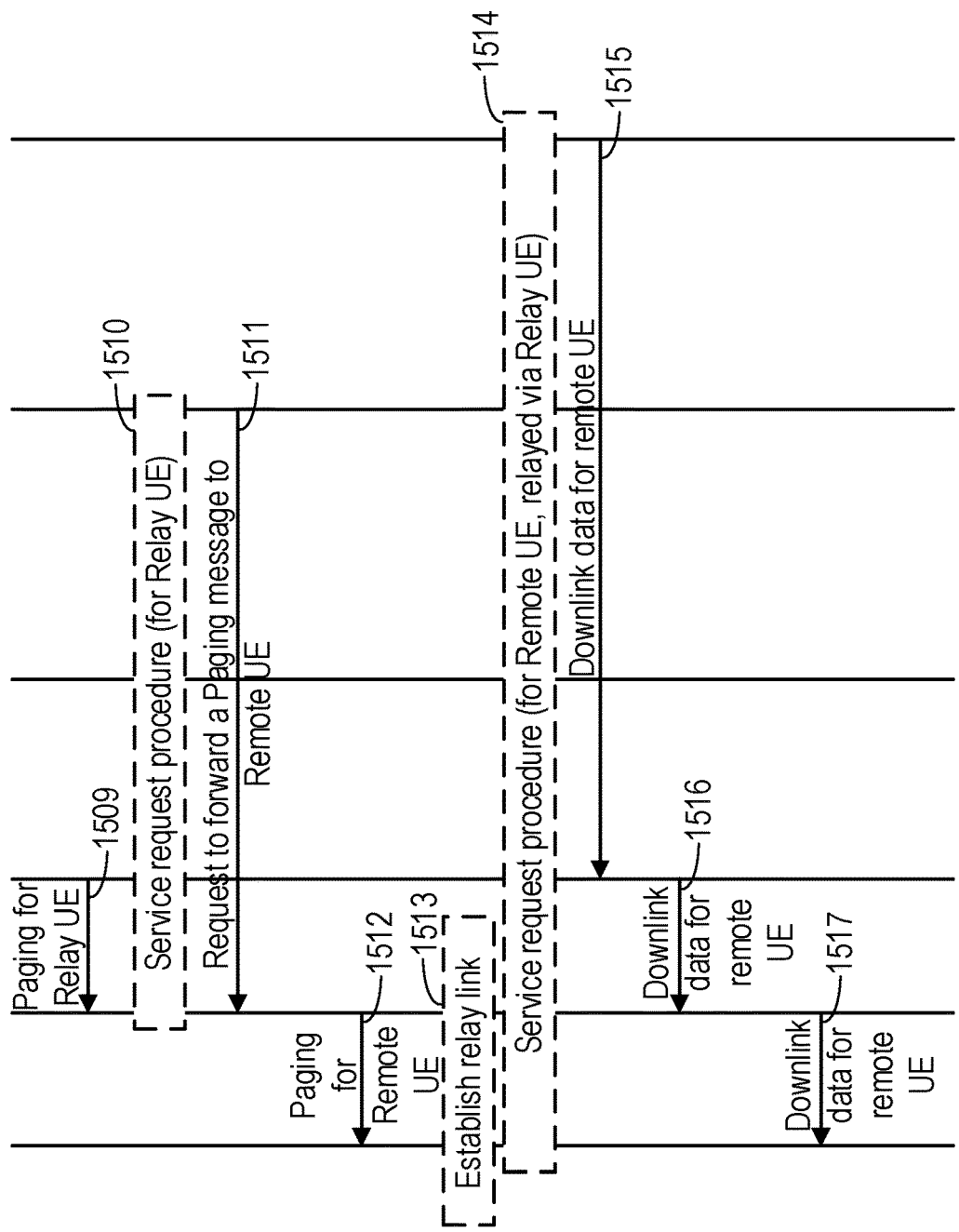
Figure 15(a)(2)

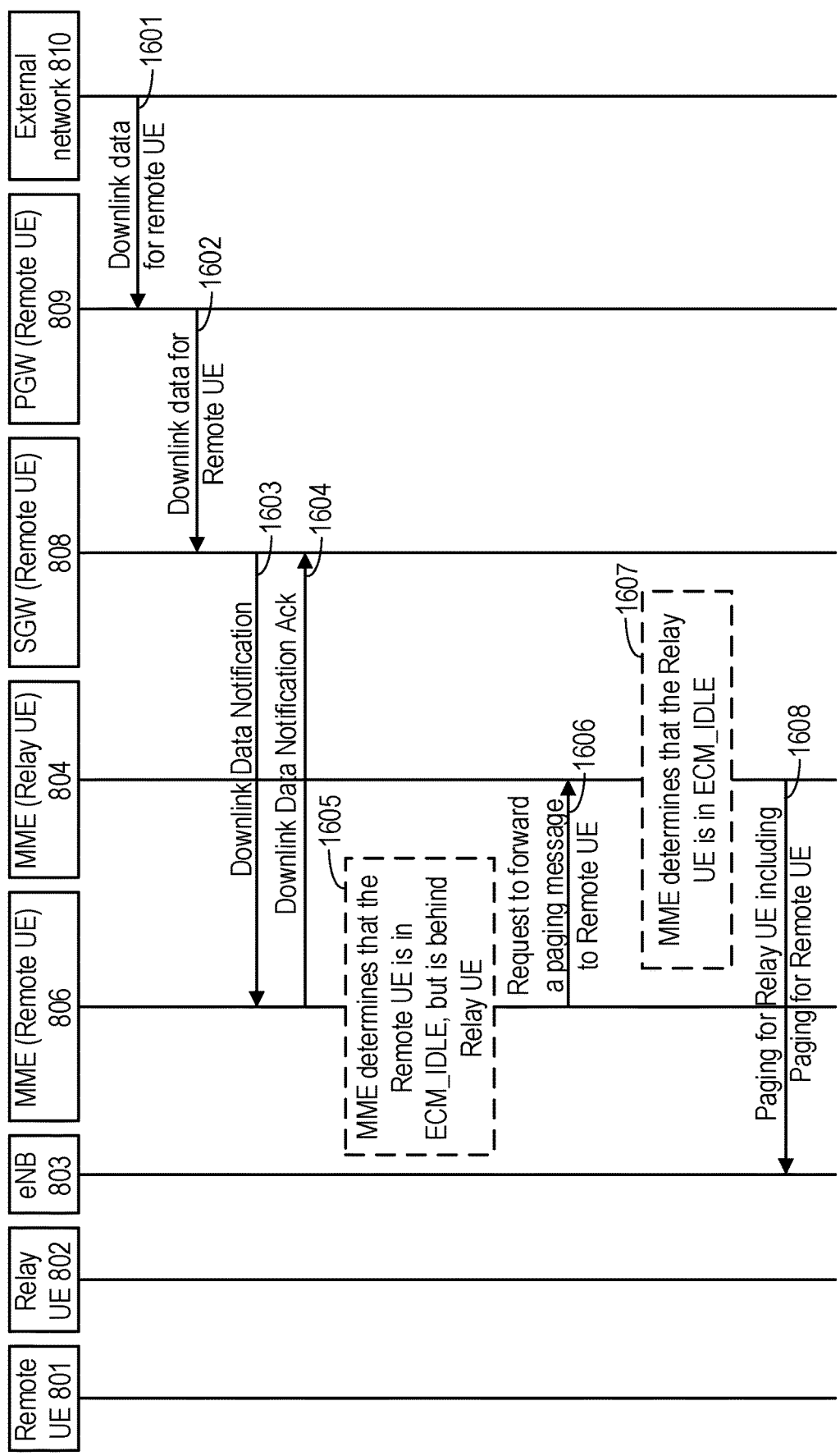
Figure 16(a)(1)

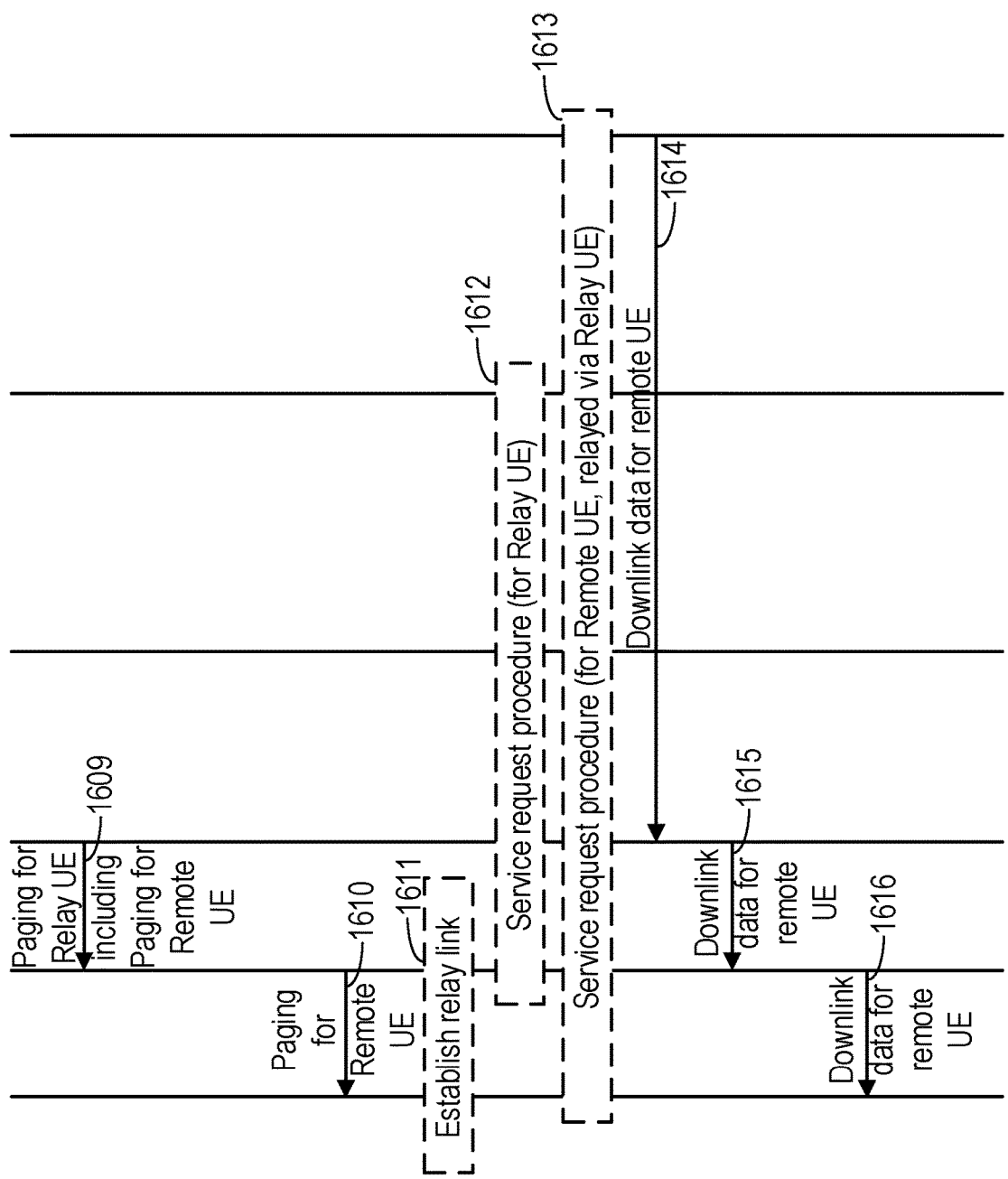
Figure 16(a)(2)

MOBILITY MANAGEMENT FOR RELAYING

BACKGROUND

Proximity-based Services (ProSe) was developed by 3GPP in Rel-12 as a way to provide device-to-device (D2D) communication over the LTE, also known as LTE sidelink communications. One application for this is Public Safety. The ProSe UE-to-Network Relay was also developed for public safety applications, initially to extend connectivity to out-of-coverage (OoC) UEs in 3GPP rel-13. FIG. 1 shows a network configuration for use in Public Safety, in which a remote UE 101 connects through a ProSe UE-to-Network Relay 103 over the direct UE-to-UE interface, also known as the LTE sidelink. The relay 103 connects over the Uu interface to a radio access network node such as an eNodeB (eNB) 105, which is connected to the Evolved Packet Core (EPC) 107. The applications, such as Mission Critical Push to Talk (MCPTT), are served by a Public Safety Application Server (AS) 109, which is connected to the EPC over a SGi interface.

The ProSe UE-to-Network Relay node 103 may for example be a UE with capabilities to serve as relay for remote UEs. FIG. 2 shows how relaying is initiated in a network such as that shown in FIG. 1, including a Mobility Management Entity (MME) 221, Serving Gateway (S-GW) 223 and PDN Gateway (P-GW) 225 as EPC network nodes. At step 201, the relay UE sets up a Packet Data Network (PDN) connection to the core network (EPC) using the Attach procedure via the eNB. At step 202, the remote UE 101 and the relay UE 103 perform a discovery procedure (using either Model A or Model B) and at step 203 they establish a connection for one-to-one communication, so that they are able to use sidelink communication over PC5. At step 204, an IP address and prefix are allocated and, at step 205, the relay UE sends a report to the MME identifying the remote user and giving IP information, and the MME sends this report to the P-GW at step 206. Thereafter, the remote UE 101 is able to send relayed traffic through the relay UE to the packet gateway. Thus, for example, the remote UE may setup a PDN connection to the network while it is in E-UTRAN network coverage. When the remote UE leaves coverage, it may start searching (using the discovery process) for a relay UE and then connect to it over the sidelink, and via the relayed data still have connectivity with the Public Safety Application Server (AS), using the PDN connection of the relay UE.

FIG. 3 is a protocol stack diagram showing the protocols in use in the network of FIG. 1. As shown in FIG. 3, the ProSe UE-to-Network Relay in rel-13 was developed as a layer 3 relay. Thus, the relaying of data takes place in the IP layer. In other words, the ProSe UE-to-Network Relay resembles the function of an IP router, and the traffic to/from the Remote UE cannot be distinguished from other traffic to/from the ProSe UE-to-Network Relay, at least not by the eNB, since the eNB does not terminate the IP layer.

In order for the ProSe UE-to-Network relaying to begin, the Prose UE-to-Network Relay UE and the ProSe Remote UE must first discover each other. The procedure to do this is that one of the UEs transmits a discovery message on the PC5 discovery channel, while the other UE monitors the PC5 discovery channel. There are two types of discovery types; Model A and B.

FIG. 4 illustrates model A discovery ("I am here"), in which, once the service has been authorised at step 401, the announcing UE, shown at 402a, broadcasts information at step 403a at pre-defined intervals, necessary for other UEs to connect to it, which the discovering UE, shown at 402b, monitors at step 403b, and processes at step 404b when it detects a match. When applied to relay discovery, the relay UEs transmit such periodic announcements, and any remote UEs may monitor these announcements.

FIG. 5 illustrates model B discovery ("who is there?"/"Are you there?), in which, once the service has been authorised at step 501, the announcing UE or discoverer UE, shown at 502b, transmits a request at step 503b with certain information it is interested to discover. The discovering UE, shown at 502a, monitors the PC5 link for ProSe query codes at step 503a, and can then respond at step 504a with information related to the discoverer's request if a ProSe query code matches. As shown at step 504b, the discoverer UE monitors PC5 for ProSe response codes. However, for Model B, only an authorized UE may announce or respond to the announcement. When applied to relay discovery, it is the remote UE which transmits the announcement (including some specific interest, e.g. which external network it wants to reach via the candidate relay UE), and the relay UE fulfilling the interest request will then have the opportunity to respond back.

Once the UEs have discovered each other, they can (if allowed by the network) establish a PC5 link between them and if allowed one of the UEs can be configured to relay traffic from the other UE to the network.

Recent developments in 3GPP now propose to introduce an evolved version of the ProSe UE-to-Network Relay, also known as evolved ProSe UE-to-Network Relay, where relaying is instead operated on layer 2. This development is part of the Further Enhanced D2D (FeD2D) study item in 3GPP RAN as part of Rel-14.

An example scenario for FeD2D is a small low powered device, which may be defined as a "wearable device", such as a wristwatch, which, in order to e.g. save battery power, instead of using the Uu radio interface, uses a D2D interface, such as LTE sidelink or some non-3GPP technology such as Bluetooth or WLAN to reach the network via an LTE UE (e.g. a smartphone) using the evolved ProSe UE-to-Network Relay. Thus, when using the evolved ProSe UE-to-Network Relay, the wearable device acts as the Remote UE and the smartphone acts as the Relay UE. This scenario is also known as relaying for wearables, or alternatively relaying for Internet of Things (IoT). As this kind of relaying is a commercial D2D application (opposed to Public Safety), aspects such as security, charging and Quality of Service (QoS) are very important. Such aspects may be better solved by a layer 2 relay compared to a layer 3 relay.

An example of a protocol architecture for the evolved ProSe UE-to-Network Relay is illustrated in FIG. 6. In general, the Remote UE and the Relay UE can be connected to the same eNB, or different eNBs if there is an X2 connection between the eNBs. The serving eNB of the remote UE provides bearers to the core network via the GTP protocol, and so the core network may not be aware that the data of these bearers are actually relayed via the relay UE. Moreover, the remote UE has still its own PDN connection, with its own IP address, even if it uses the evolved ProSe UE-to-Network Relay.

There is a need for a method allowing downlink data, for a remote UE, to be delivered to a relay UE, even if the relay UE is idle mode, using DRX and monitoring its own paging occasions.

SUMMARY

According to the present invention, there is provided a method of operation of a node in a cellular communications network, the method comprising: when said node is serving a first User Equipment, UE, obtaining information about a second UE that may be used as a relay by the first UE. In the event that there is data to be sent to the first UE, further information is obtained, and the node sends a request to a node serving the second UE.

According to the present invention, there is provided a node in a cellular communications network, comprising a processor and a memory. The memory contains instructions executable by the processor, such that the node is operable to: when said node is serving a first User Equipment, UE, obtain information about a second UE that may be used as a relay by the first UE; obtain information in the event that there is data to be sent to the first UE; and send a request to a node serving the second UE.

According to the present invention, there is provided a node in a cellular communications network. The node comprises: a first obtaining module for, when said node is serving a first User Equipment, UE, obtaining information about a second UE that may be used as a relay by the first UE; a second obtaining module for obtaining information in the event that there is data to be sent to the first UE; and a sending module for sending a request to a node serving the second UE.

According to the present invention, there are provided a computer program configured, when run on a computer, to carry out the method; and a computer program product comprising a computer readable medium and the computer program.

According to the present invention, there is provided a method of operation of a node in a cellular communications network. The method comprises: when said node is serving a second User Equipment, UE, receiving a request from a node serving a first UE; determining whether the second UE is in a connected mode or an idle mode; and, if the received request is a request to forward a paging message to the first UE, and it is determined that the second UE is in the connected mode, sending to the second UE a request to forward the paging message to the first UE.

According to the present invention, there is provided a node in a cellular communications network comprising a processor and a memory. The memory contains instructions executable by the processor, such that the node is operable to: when said node is serving a second User Equipment, UE, receive a request from a node serving a first UE; determine whether the second UE is in a connected mode or an idle mode; and, if the received request is a request to forward a paging message to the first UE, and it is determined that the second UE is in the connected mode, send to the second UE a request to forward the paging message to the first UE.

According to the present invention, there is provided a node in a cellular communications network. The node comprises: a receiving module for, when said node is serving a second User Equipment, UE, receiving a request from a node serving a first UE; a determining module for determining whether the second UE is in a connected mode or an idle mode; and a sending module for, if the received request is a request to forward a paging message to the first UE, and it is determined that the second UE is in the connected mode, sending to the second UE a request to forward the paging message to the first UE.

According to the present invention, there are provided a computer program configured, when run on a computer, to carry out the method; and a computer program product comprising a computer readable medium and the computer program.

According to the present invention, there is provided a method of operation of a node in a cellular communications network. The method comprises: when said node is serving a second User Equipment, UE, receiving a request from a node serving a first UE; determining whether the second UE is in a connected mode or an idle mode; and, if the received request is a request to forward a paging message to the first UE, and it is determined that the second UE is in the idle mode, sending a message to a radio access node serving the second UE, requesting said radio access node to page the second UE.

According to the present invention, there is provided a node in a cellular communications network comprising a processor and a memory. The memory contains instructions executable by the processor, such that the node is operable to: when said node is serving a second User Equipment, UE, receive a request from a node serving a first UE; determine whether the second UE is in a connected mode or an idle mode; and, if the received request is a request to forward a paging message to the first UE, and it is determined that the second UE is in the idle mode, send a message to a radio access node serving the second UE, requesting said radio access node to page the second UE.

According to the present invention, there is provided a node in a cellular communications network. The node comprises: a receiving module for, when said node is serving a second User Equipment, UE, receiving a request from a node serving a first UE; a determining module for determining whether the second UE is in a connected mode or an idle mode; and a sending module for, if the received request is a request to forward a paging message to the first UE, and it is determined that the second UE is in the idle mode, sending a message to a radio access node serving the second UE, requesting said radio access node to page the second UE.

According to the present invention, there are provided a computer program configured, when run on a computer, to carry out the method; and a computer program product comprising a computer readable medium and the computer program.

According to the present invention, there is provided a method of operation of a node in a cellular communications network. The method comprises: when said node is serving a second User Equipment, UE, receiving a request from a node serving a first UE; determining whether the second UE is in a connected mode or an idle mode; and, if the received request is a request from the radio access node serving the first UE to find the second UE, and it is determined that the second UE is in the idle mode, sending a message to a radio access node serving the second UE, requesting said radio access node to page the second UE.

According to the present invention, there is provided a node in a cellular communications network comprising a processor and a memory. The memory contains instructions executable by the processor, such that the node is operable to: when said node is serving a second User Equipment, UE, receive a request from a node serving a first UE; determine whether the second UE is in a connected mode or an idle mode; and, if the received request is a request from the radio access node serving the first UE to find the second UE, and it is determined that the second UE is in the idle mode, send a message to a radio access node serving the second UE, requesting said radio access node to page the second UE.

According to the present invention, there is provided a node in a cellular communications network. The node comprises: a receiving module for, when said node is serving a second User Equipment, UE, receiving a request from a node serving a first UE; a determining module for determining whether the second UE is in a connected mode or an idle mode; and a sending module for, if the received request is a request from the radio access node serving the first UE to find the second UE, and it is determined that the second UE is in the idle mode, sending a message to a radio access node serving the second UE, requesting said radio access node to page the second UE.

According to the present invention, there are provided a computer program configured, when run on a computer, to carry out the method; and a computer program product comprising a computer readable medium and the computer program.

According to the present invention, there is provided a method of operation of a User Equipment, UE, in a cellular communications network. The method comprises: receiving a paging message, wherein the paging message contains an identity of said UE, and an identity of at least one other UE in a linked list; in response to determining the identity of said UE as a first item in the list, forwarding a paging notification to the or each other UE whose identity is included in the list.

According to the present invention, there is provided a User Equipment comprising a processor and a memory. The memory contains instructions executable by the processor, such that the UE is operable to: receive a paging message, wherein the paging message contains an identity of said UE, and an identity of at least one other UE in a linked list; in response to determining the identity of said UE as a first item in the list, forward a paging notification to the or each other UE whose identity is included in the list.

According to the present invention, there is provided a User Equipment. The UE comprises: a receiving module, for receiving a paging message, wherein the paging message contains an identity of said UE, and an identity of at least one other UE in a linked list; and a forwarding module for, in response to determining the identity of said UE as a first item in the list, forwarding a paging notification to the or each other UE whose identity is included in the list.

According to the present invention, there are provided a computer program configured, when run on a computer, to carry out the method; and a computer program product comprising a computer readable medium and the computer program.

DETAILED DESCRIPTION

Figure 1:
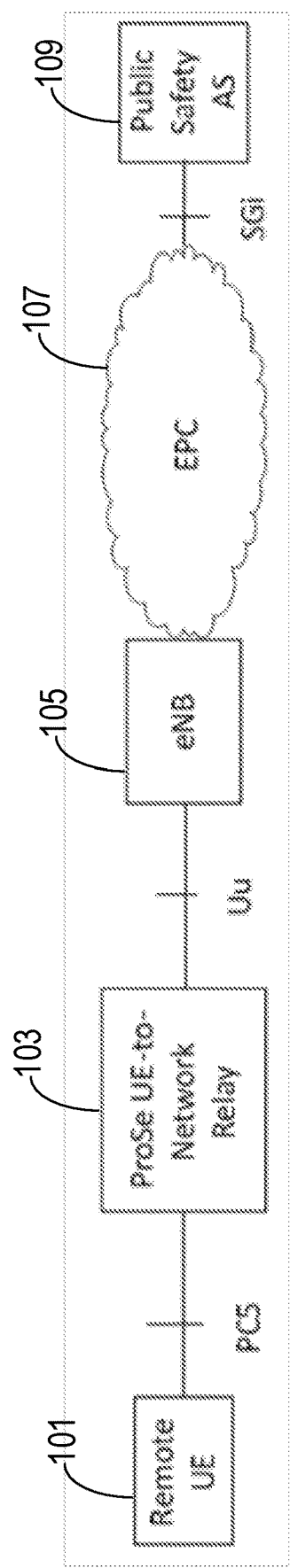
FIG. 1 shows a part of a network.
Figure 2:
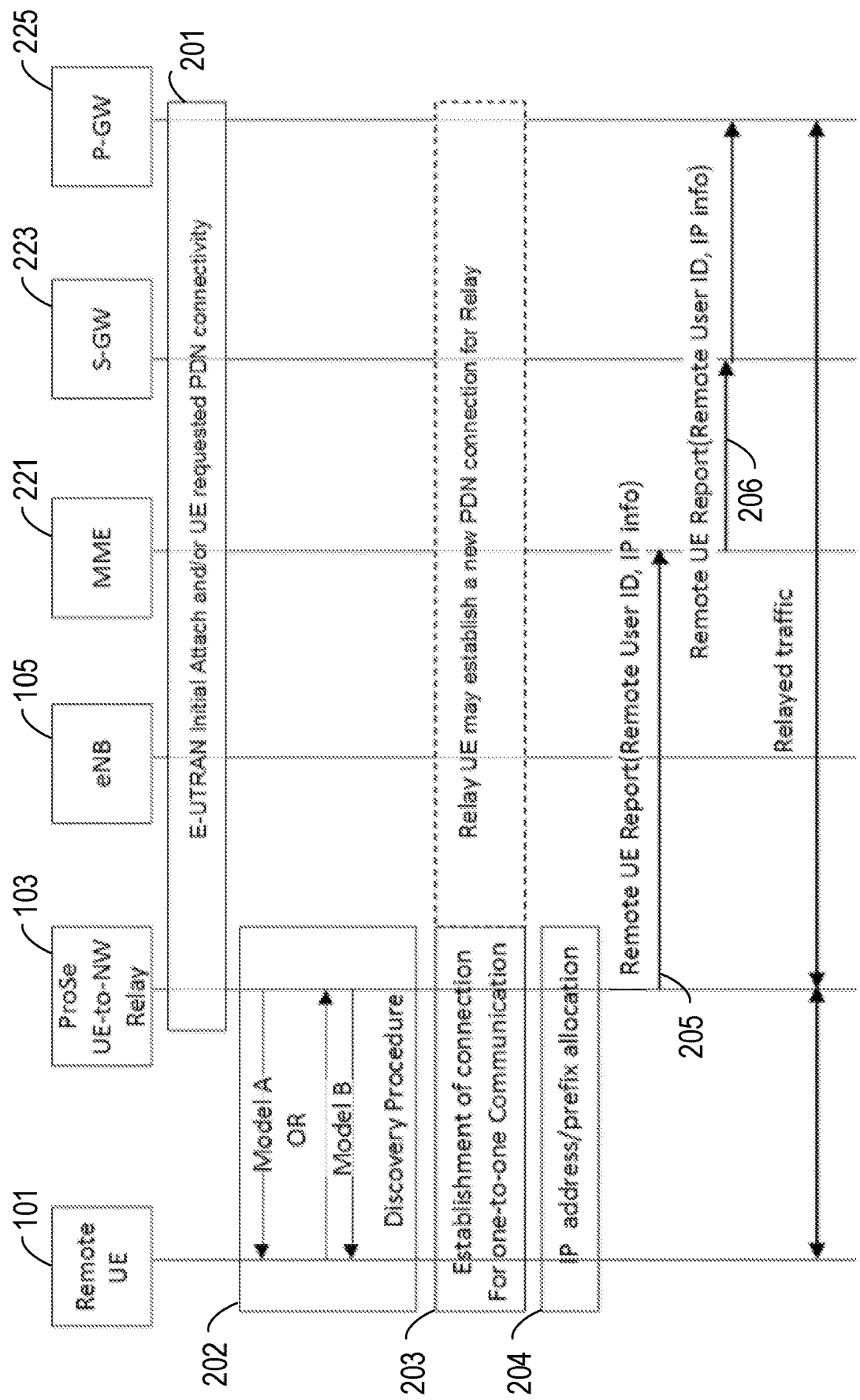
FIG. 2 illustrates signalling in the network of FIG. 1.
Figure 3:
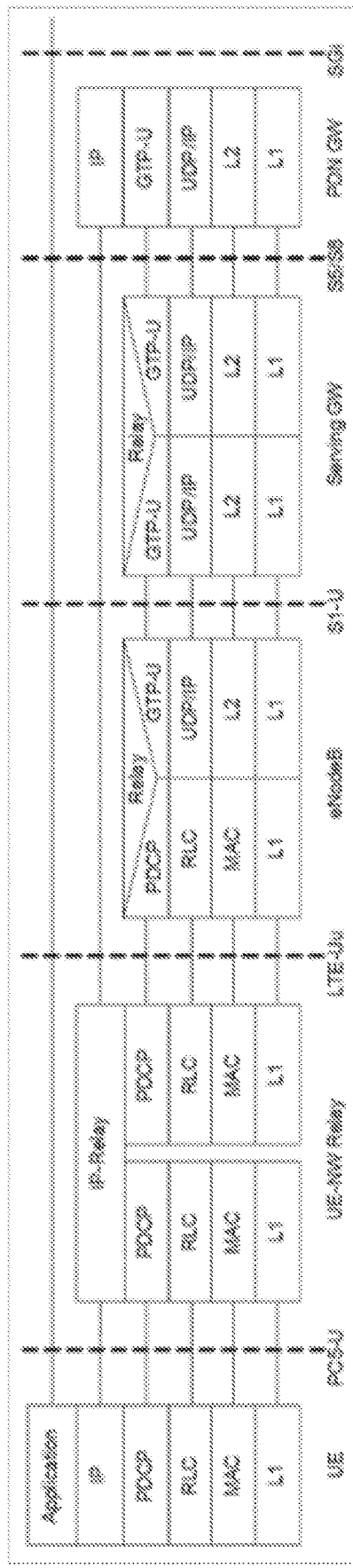
FIG. 3 illustrates signalling in the network of FIG. 1.
Figure 4:
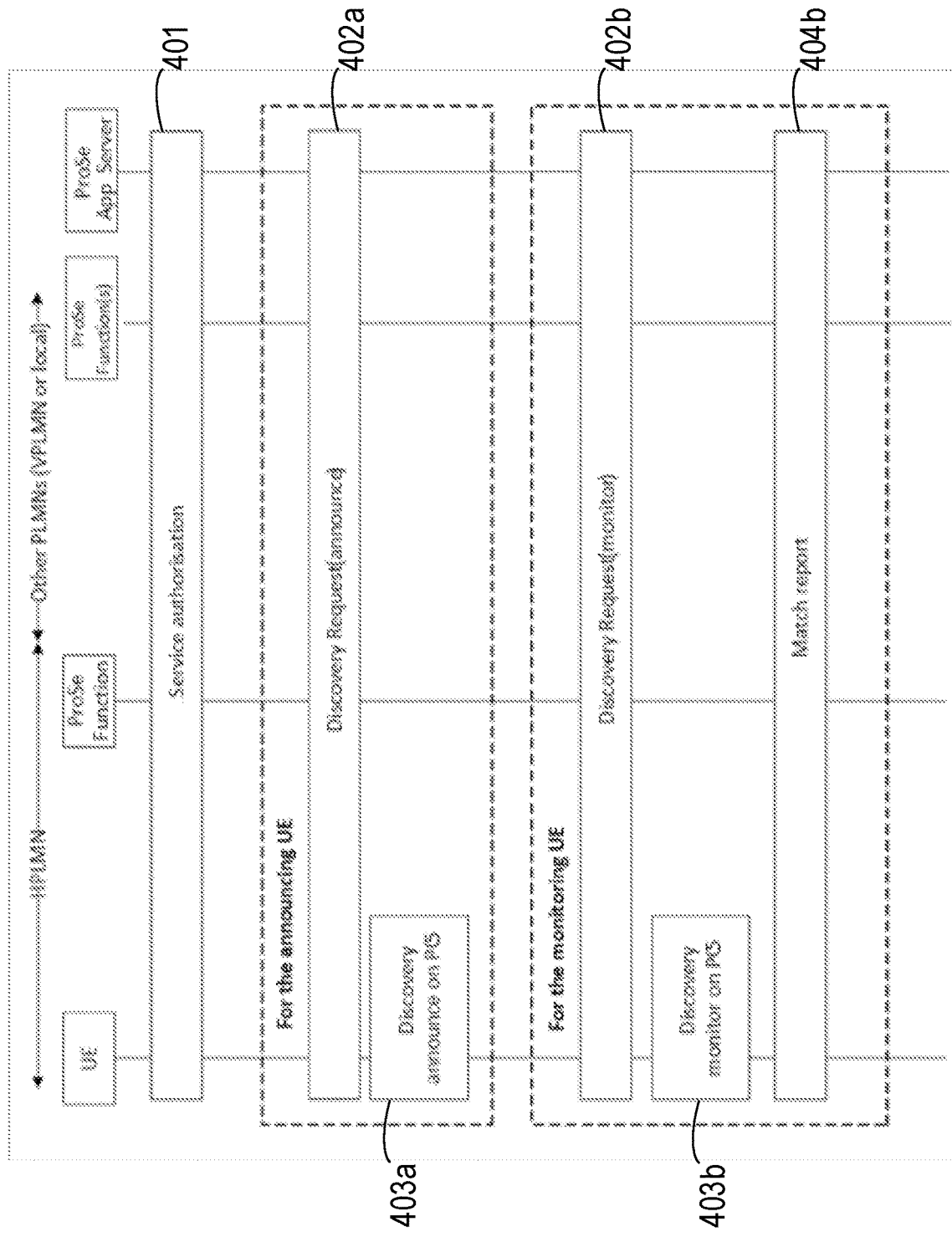
FIG. 4 illustrates signalling in the network of FIG. 1.
Figure 5:
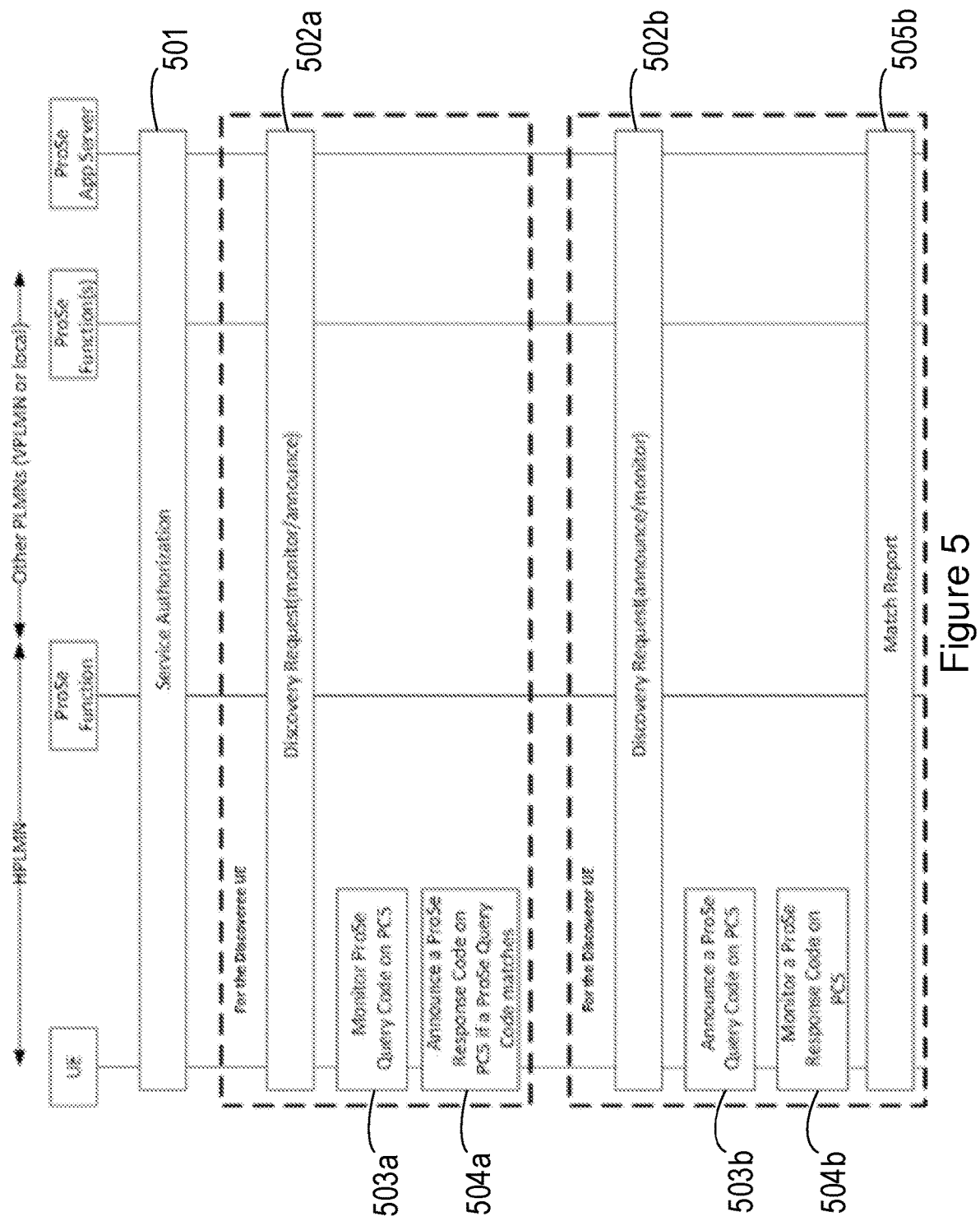
FIG. 5 illustrates signalling in the network of FIG. 1.
Figure 6:
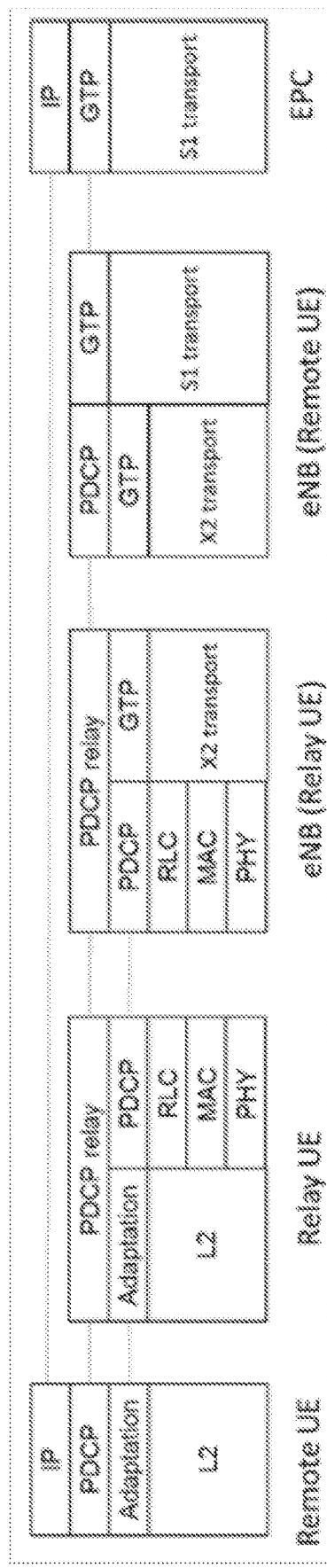
FIG. 6 illustrates signalling in the network of FIG. 1.

The following sets forth specific details, such as particular embodiments for purposes of explanation and not limitation. But it will be appreciated by one skilled in the art that other embodiments may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers that are specially adapted to carry out the processing disclosed herein, based on the execution of such programs. Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors, one or more processing modules or one or more controllers, and the terms computer, processor, processing module and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Although the description is given for user equipment (UE), it should be understood by the skilled in the art that "UE" is a non-limiting term comprising any mobile or wireless device or node equipped with a radio interface allowing for at least one of: transmitting signals in uplink (UL) and receiving and/or measuring signals in downlink (DL). A UE herein may comprise a UE (in its general sense) capable of operating or at least performing measurements in one or more frequencies, carrier frequencies, component carriers or frequency bands. It may be a "UE" operating in single- or multi-radio access technology (RAT) or multi-standard mode. As well as "UE", the terms "mobile station" ("MS"), "mobile device" and "terminal device" may be used interchangeably in the following description, and it will be appreciated that such a device does not necessarily have to be 'mobile' in the sense that it is carried by a user. Instead, the term "mobile device" encompasses any device that is capable of communicating with communication networks that operate according to one or more mobile communication standards, such as the Global System for Mobile communications, GSM, UMTS, Long-Term Evolution, LTE, IEEE 802.11 or 802.16, etc.

The description involves communication between a UE and a radio access network, which typically includes multiple radio access nodes. In the specific example given, the radio access nodes take the form of eNodeBs (eNBs), as defined by 3GPP. However, it will be appreciated that the invention may involve any radio access nodes. Moreover, where the following description refers to steps taken in or by a radio access node, this also includes the possibility that some or all of the processing and/or decision making steps may be performed in a device that is physically separate from the radio antenna of the radio access node, but is logically connected thereto. Thus, where processing and/or decision making is carried out "in the cloud", the relevant processing device is considered to be part of the radio access node for these purposes.

The methods described herein relate generally to issues around mobility management, so we describe briefly the mobility management procedures in the Evolved Packet System, by way of illustration.

In the Evolved Packet System (EPS), based on the Long Term Evolution (LTE) radio access technology, there are a set of UE states defined in the three control plane protocol layers EPS Mobility Management (EMM), EPS Connection Management (ECM) and Radio Resource Control (RRC). EMM and ECM are both part of the Non-Access Stratum (NAS), while RRC is part of the Access Stratum (AS).

EPS Mobility Management (EMM) states describe the states that result from the mobility management procedures e.g. Attach and Tracking Area Update procedures. The two main EMM states are:

EMM-DEREGISTERED: In the EMM DEREGISTERED state, the EMM context in MME holds no valid location or routing information for the UE. The UE is not reachable by a MME, as the UE location is not known.

EMM-REGISTERED: The UE enters the EMM-REGISTERED state by a successful registration with an Attach procedure. The UE location is typically known in the MME to at least an accuracy of the tracking area list allocated to that UE. In this state, the UE performs a tracking area update, using EMM signalling, towards the Mobility Management Entity (MME) node, in order to inform it of e.g. which tracking area the UE is located in. The Tracking Area Identity (TAI) is provided as part of the system information (SIB1) transmitted in the RRC layer in the eNBs in each cell.

EPS Connection Management (ECM) states describe the signalling connectivity between the UE and the core network. The two main ECM states are:

ECM-IDLE: A UE is in ECM-IDLE state when no NAS signalling connection between UE and network exists. In ECM-IDLE state, a UE performs cell selection/reselection, which may trigger the EMM layer to perform a Tracking Area update.

ECM-CONNECTED: For a UE in the ECM-CONNECTED state, there exists a signalling connection between the UE and the MME. The signalling connection is made up of two parts: an RRC connection and an S1-MME connection. The UE location is known in the MME with an accuracy of a serving eNB.

Radio Resource Control (RRC) states describe the UE activity level as well as the signalling connectivity between the UE and the radio access network, specifically the Evolved Universal Terrestrial Radio Access Network (E-UTRAN), and in particular an eNB of the radio access network. The two RRC states are:

RRC_IDLE: There is no RRC Connection established between the UE and the E-UTRAN. In this state, the UE saves power since it only needs to monitor the paging channel on the configured paging occasions as well as the broadcasted system information. The UE performs cell selection/reselection. No data, other than downlink broadcast/multicast, can be transferred between the UE and E-UTRAN. In RRC_IDLE, the UE normally is in ECM-IDLE as well. The combination RRC_IDLE+ECM-IDLE is normally referred to as "idle mode".

RRC_CONNECTED: There is an RRC Connection established between the UE and the E-UTRAN. In this state, data can be transferred over the established radio bearers. The mobility of the UE is handled by the handover procedure, controlled by the serving eNB. In RRC_CONNECTED, the UE normally is in ECM-CONNECTED as well. The combination RRC_CONNECTED+ECM-CONNECTED is normally referred to as "connected mode".

In LTE, discontinuous reception (DRX) was introduced to reduce the power consumption and increase the battery lifetime of the UE.

In RRC_IDLE, when DRX is used the UE needs only to monitor one paging occasion per DRX cycle. A default DRX cycle is provided in the system information (SIB2). A UE specific DRX cycle may in addition be agreed between the UE and the MME using EMM signalling, e.g. during the Attach procedure. The UE uses the shortest one of the default and UE specific DRX cycles.

The Paging Frame (PF) is one Radio Frame, which may contain one or multiple Paging Occasion(s) (PO). The UE specific PF and PO are determined by the DRX cycle period and the International Mobile Subscriber Identity (IMSI) of the UE, as specified in 3GPP TS 36.304.

When a UE is in idle mode (ECM-IDLE+RRC_IDLE), and there is downlink data to be sent to the UE, since there are no radio bearers established, the Network Triggered Service Request procedure needs to be used before the data can be sent from the network to the UE. The procedure is described in 3GPP TS 24.301 section 5.3.4.3.

Figure 7:
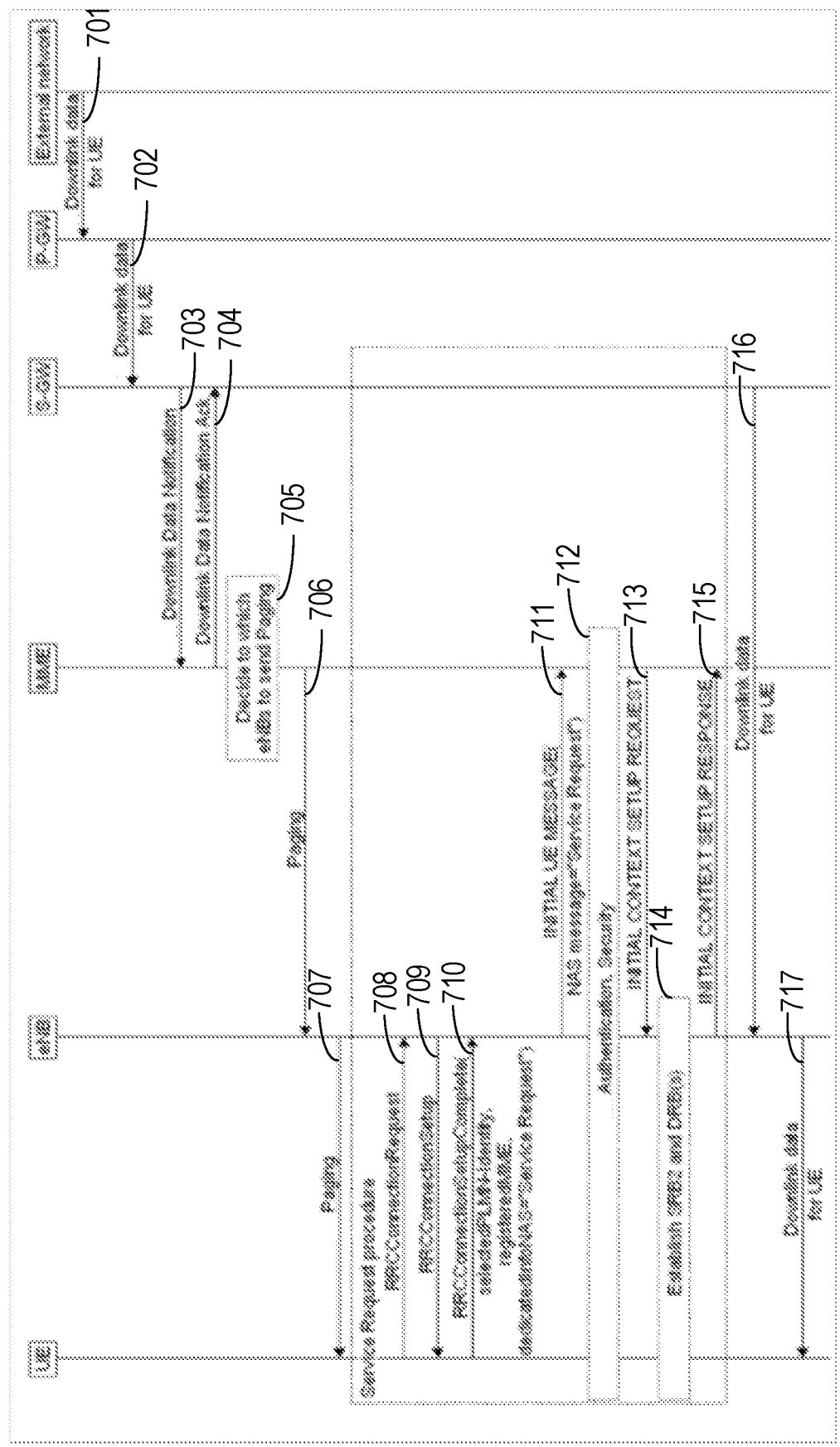
FIG. 7 illustrates signalling in the network of FIG. 1.

FIG. 7 illustrates the Network Triggered Service Request procedure.

The start of this procedure is that downlink data is received from an external network by the P-GW in step 701. Since the UE is in ECM-IDLE and no bearers are established, in steps 702 and 703 the P-GW notifies the MME of the downlink data. In step 704 the MME acknowledges the notification, and in step 705 the MME identifies one or more eNB in one or several cells (e.g. the cell where the UE was last in RRC_CONNECTED, or a group of cells, such as all cells belonging to the Tracking Area where the UE last time made a Tracking Area Update). The MME then in steps 706 and 707 initiates a Paging procedure where Paging messages are sent, via the identified eNB(s).

The Paging message includes the identity of the UE (e.g. S-TMSI or IMSI) and is transmitted in one of the paging occasions that are specific for the UE (which are based on the DRX cycle and the UE identity, IMSI, as described above). Triggered by the received Paging message with the identity of the UE, in step 708 the UE initiates a Service Request procedure by first transmitting an RRC Connection Request message. After receiving the RRCConnectionSetup message in step 709, the UE transmits an RRCConnectionSetupComplete message in step 710, including NAS information, which is a Service Request message. In step 711, the Service Request message is forwarded by the eNB to the registered (serving) MME of the UE. After successful authentication and start of security functions in step 712 (ciphering and integrity protection), bearers are established in steps 713 and 714, over which the downlink data can be finally be sent to the UE in steps 716 and 717.

In the FeD2D scenario in 3GPP, a wearable device operating as a Remote UE that uses connectivity via a Relay UE towards the network is typically a small cheap device with limited battery capacity. The main purpose of the relaying is to save power in the remote UE by transmitting and receiving on the short-distance relay link between the remote UE and the relay UE, and using the relay UE to transmit and receive on the long-distance terrestrial link to/from the eNB.

However, even if the relaying saves power in the remote UE, given that the remote UE does not monitor the downlink directly from the eNB, each time there is downlink data for the remote UE it needs to be sent first to the relay UE. In low-traffic situations, typically the relay UE also needs to save power, by entering idle mode and monitoring the paging channel. Especially when a relay UE serves multiple remote UEs it is important to save power in the relay UE, otherwise the battery in the relay UE will quickly run out of energy.

If we assume that the relay UE is in idle mode and downlink data needs to be sent to a remote UE, it is not possible to send the data immediately since this requires the relay UE to enter connected mode (RRC_CONNECTED) and establish radio bearers on which the downlink data can be sent. According to the Network Triggered Service Request Procedure shown in FIG. 7, when downlink data for a UE in idle mode enters the network, the MME serving this UE is notified by the P-GW serving the UE, and this MME has the opportunity to use a paging procedure towards the UE. This would apply, for example, when there is downlink data for a relay UE, and this would trigger a paging procedure towards the relay UE, causing it to enter connected mode.

However, this would not apply, in the case where there is data for the remote UE. In the Rel-13 ProSe UE-to-Network Relay procedure, as described above, the serving MME of the Relay UE gets notified of the identity of the Remote UE in the Remote UE Report message. However, the serving MME of the Remote UE does not know the relation between the Remote UE and the Relay UE.

One possible solution would be that, when downlink (DL) data for the remote UE arrives, the P-GW notifies the MME serving the Remote UE and the MME initiates paging to the remote UE via a set of eNBs, in the normal way. However, the Remote UE, when connected to the Relay UE, needs to save power and therefore should not need to monitor the paging channel directly. A way to overcome this is that the relay UE monitors paging on behalf of the remote UE (i.e. monitors the UE identity of the Remote UE as well as its own identity). When it receives a paging message with the identity of the remote UE it can then in some way notify the remote UE on the relay link. This solution has a problem in that, since the paging occasions are specific for the remote UE, the relay UE needs to monitor them as well as its own paging occasions. In particular this would be a problem with many remote UEs served by the same Relay UE, leading to battery drain of the relay UE. As another drawback with this solution, the relay UE would need to be able to determine the paging occasions of the remote UE, suggesting it needs to know both the IMSI and any specific DRX cycle, configured by the eNB, of the Remote UE.

As described in more detail below, one solution is to obtain the relationship between the Remote UE and the Relay UE, and use this relationship when there is downlink data for the Remote UE.

More specifically, and again as described in more detail below, a network node, for example but not necessarily the MME serving the Remote UE, obtains and stores information about which Relay UE or UEs is/are or may be used by the Remote UE. This information may for example be sent from the Remote UE, Relay UE or one of the eNB serving the UE(s). When there is downlink data for the Remote UE, the MME uses this stored information to transmit a request to the MME(s) serving the Relay UE(s).

If the Relay UE is in idle mode, the Relay UE is paged as part of this process, using the paging occasions used by the Relay UE.

If the Remote UE is in idle mode, a paging message for the Remote UE is forwarded via the Relay UE.

This enables the relay UE, participating in evolved UE-to-Network relaying, to enter idle mode, still allowing the remote UE to be reachable via the relay UE. In this way, power is saved in both the remote UE and the relay UE. As part of the method the relay UE only needs to monitor its own paging occasions causing only marginal extra power consumption in idle mode caused by the remote UEs connected over the relay link. A further advantage, using embodiments of this invention, is that a Remote UE may switch to use a different Relay UE, in some cases without need to inform the network about the change, and still be reachable when downlink data is available for the Remote UE.

Figure 8:
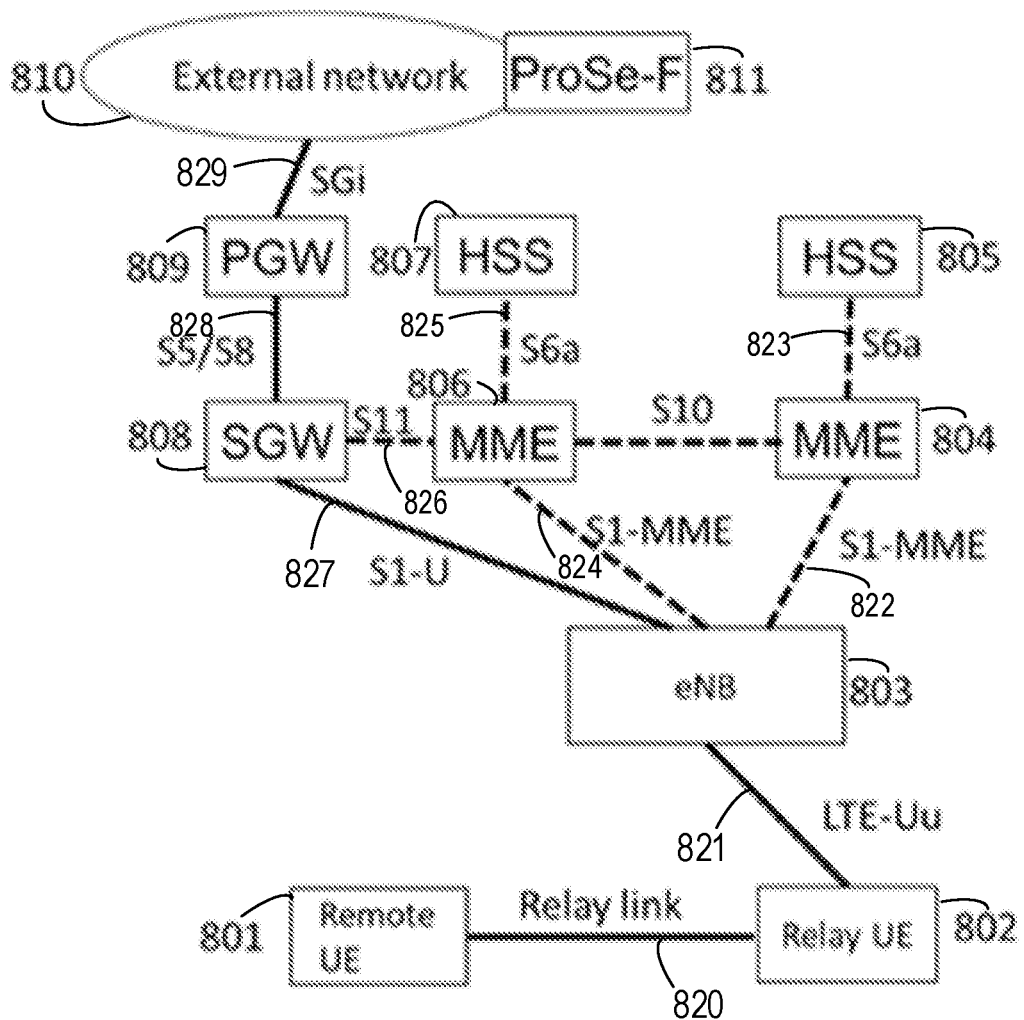
FIG. 8 illustrates a part of a cellular communications network.

FIG. 8 illustrates the main entities and the interfaces in a system according to one embodiment.

The Remote UE 801 is a User Equipment (UE), for example a small device, such as a wearable device, which supports D2D communication such as LTE sidelink or WiFi with the Relay UE 802 over the Relay link 820. This device acts as the Remote UE for Evolved ProSe UE-to-Network Relaying.

The Relay UE 802 is a UE, for example a smartphone, supporting LTE-Uu over the interface 821 towards the eNB 803 as well as D2D communication such as LTE sidelink or WiFi over the Relay link 820. This device is acts as the Relay UE for Evolved ProSe UE-to-Network Relaying.

An Evolved NodeB (eNB) 803 receives and transmits radio signals with the Relay UE 802 over the LTE-Uu interface 821. In the illustrative embodiments described here, the Remote UE 801 and the Relay UE 802 are served by the same eNB 803. However, they may be served by different eNBs.

A Mobility Management Entity (MME) 804 serves the Relay UE 802 and provides control plane functions such as mobility management and Non Access Stratum (NAS) signalling towards the Relay UE 802. The MME 804 is connected with the eNB 803 over the S1-MME interface 822 and with the Home Subscriber Server (HSS) 805 over the S6a interface 823.

The Home Subscriber Server (HSS) 805 stores subscription information for the Relay UE 802 and the identity of the MME 804 currently serving the Relay UE 802. The HSS 805 is connected to the MME 804 over the S6a interface 823.

The Mobility Management Entity (MME) 806 serves the Remote UE 801 and provides control plane functions such as mobility management and Non Access Stratum (NAS) signalling towards the Remote UE 801. The MME 806 is connected with the eNB 803 over the S1-MME interface 824, with the HSS 807 over the S6a interface 825, and with the Serving Gateway (SGW) 808 over the S11 interface 826.

The Home Subscriber Server (HSS) 807 stores subscription data for the Remote UE 801 and the identity of the MME 806 currently serving the Remote UE 801. The HSS 807 is connected to the MME 806 over the S6a interface 825.

The Serving Gateway (SGW) 808 serves the Remote UE 801, and is the interface between the core network and the radio access network in the user plane. The SGW 808 is connected to the eNB 803 over the S1-U interface 827, the MME 806 over the S11 interface 826, and the PDN Gateway (PGW) 809 over the S5/S8 interface 828.

The Packet Data Network (PDN) Gateway PGW 809 serves the Remote UE 801, and is the interface between the core network and the external packet data network (PDN) 810 in the user plane. The PGW 809 is connected with the SGW 808 over the S5/S8 interface 828, and with the external network 810 over the SGi interface 829.

The external network 810 is an IP-based packet data network (PDN) which may be the mobile operator's intranet or the Public Internet. It is connected to the PGW 809 over the SGi interface 829. The Proximity-based Services Function (ProSe-F) 811 may be part of the External network in the case where it is an intranet.

The Proximity-based Services Function(s) (ProSe-F) 811 is/are used to support ProSe D2D communication and discovery by the Remote UE 801 and Relay UE 802, such as support for charging, security, discovery and provisioning of parameters in the UE. It typically is part of an operator's intranet, represented in FIG. 8 by the external network 810.

Figure 9A:
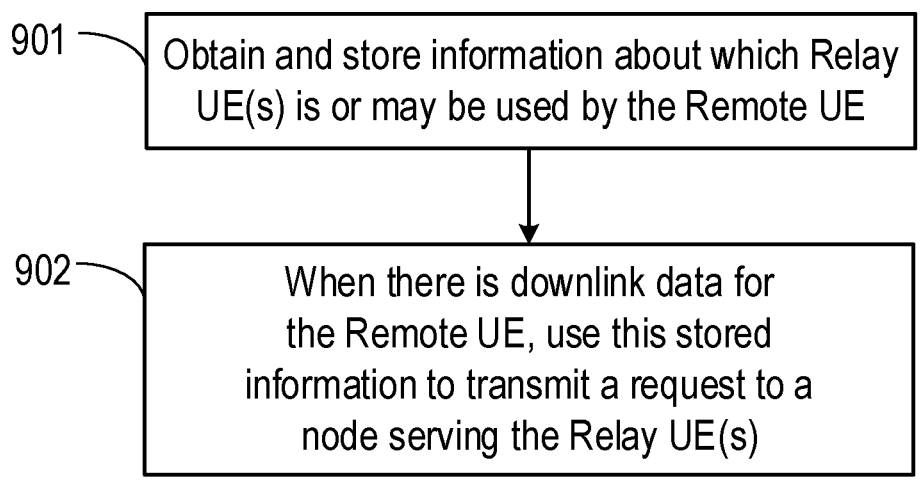
FIGS. 9a and 9b illustrate methods performed in a network.
Figure 9B:
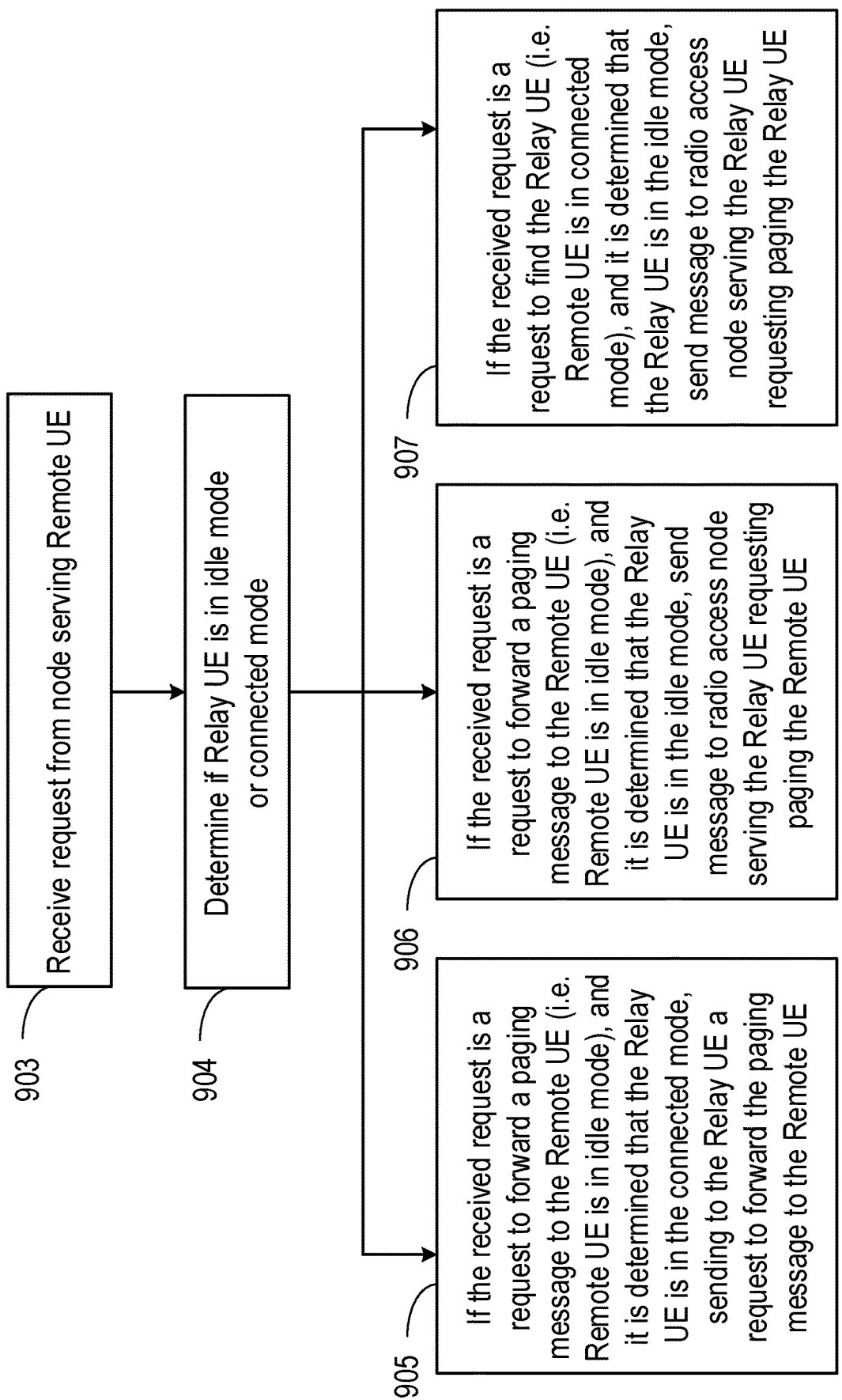

FIG. 9 contains flowcharts illustrating the main steps of the methods described herein.

Specifically, FIG. 9(*a*) shows steps taken in a network node serving the Remote UE 801, which may for example be a mobility management entity such as the MME 806 serving the Remote UE 801, or may be a radio access node such as the eNB 803 serving the Remote UE 801.

In step 901, the MME 806 obtains information about the or each Relay UE, such as Relay UE 802, which is being used as a relay or may be used as a relay by the Remote UE 801.

In step 902, it is determined that there is downlink data for the Remote UE 801. This may be downlink data entering from the external network 810, or may alternatively be signalling for the Remote UE 801 that needs to be sent from the network node such as the MME 806 or eNB 803. The node, such as the MME 806 or eNB 803, receives a message when there is data to be sent to the first UE, and then uses the stored information about the Relay UE(s), such as the Relay UE 802, to transmit a request (in the form of a signalling message) to the or each MME, for example the MME 804 serving the Relay UE 802.

FIG. 9(*b*) shows steps taken in a network node, such as the MME 804, which is serving the Relay UE 802, which is being used as a relay or may be used as a relay by the Remote UE 801.

In step 903, the or each MME 804 receiving the request described in step 902 determines the state of the Relay UE, such as the Relay UE 802, that is served by this MME.

In step 904, the MME 804 determines whether the Relay UE, for example the Relay UE 802, is in connected mode or in idle mode.

Step 905 shows that, if the received request is a request to forward a paging message to the Remote UE (i.e. the Remote UE is in idle mode), and it is determined that the Relay UE is in the connected mode, the MME 804 sends to the Relay UE a request to forward the paging message to the Remote UE.

Step 906 shows that, if the received request is a request to forward a paging message to the Remote UE (i.e. the Remote UE is in idle mode), and it is determined that the Relay UE is in the idle mode, the MME 804 sends a message to a radio access node serving the Relay UE, requesting paging the Remote UE.

Step 907 shows that, if the received request is a request to find the Relay UE (i.e. the Remote UE is in connected mode), and it is determined that the Relay UE is in the idle mode, the MME 804 sends a message to a radio access node serving the Relay UE requesting paging the Relay UE.

Thus, if the Relay UE is in idle mode, the Relay UE is paged by the MME serving this Relay UE, using the paging occasions used by the Relay UE.

If the Remote UE is in idle mode, a message (such as a Paging message) is forwarded to the Remote UE via the Relay UE.

Thereafter, the signalling or data can be sent to the Remote UE.

In step 901 above, it was mentioned that the MME 806 obtains information about the or each Relay UE, such as Relay UE 802, which is being used as a relay or may be used as a relay by the Remote UE 801.

Four alternatives are described below for obtaining the relationship between the Remote UE 801 and the Relay UE 802.

Figure 10:
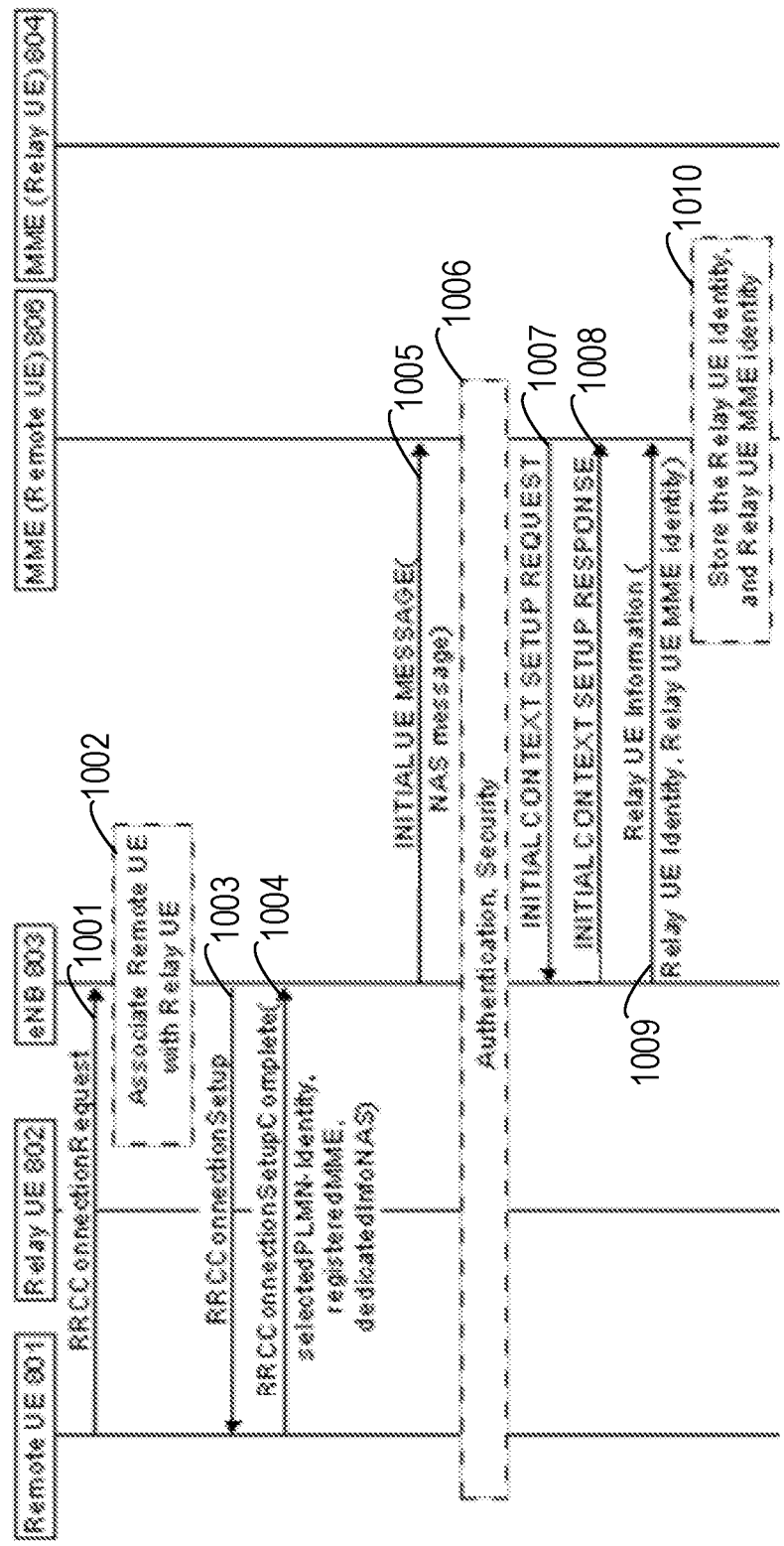
FIG. 10 illustrates signalling in a network.

FIG. 10 shows an example of the first alternative, in which the eNB 803 informs the MME 806 of the relay UE information during a NAS procedure.

At steps 1001 to 1004, the Remote UE 801 establishes an RRC connection via the Relay UE 802. In step 1002, the eNB 803 associates the Remote UE 801 with the Relay UE 802 and obtains information about the Relay UE 802. Thus, after the relaying relationship has been set up, in step 1009, the eNB 803 sends to the MME 806 that is serving the Remote UE 801 a message containing this information about the Relay UE 802. For example, the message may contain the identity of the Relay UE 802 and the identity of the MME 804 serving the Relay UE. At step 1010, the MME 806 that is serving the Remote UE 801 stores the information about the Relay UE 802. It should be understood that the information in the Relay UE Information message may also be contained in a different type of message, such as the INITIAL UE MESSAGE in step 1005 or the INITIAL CONTEXT SETUP RESPONSE in step 1008 or any other message.

Figure 11:
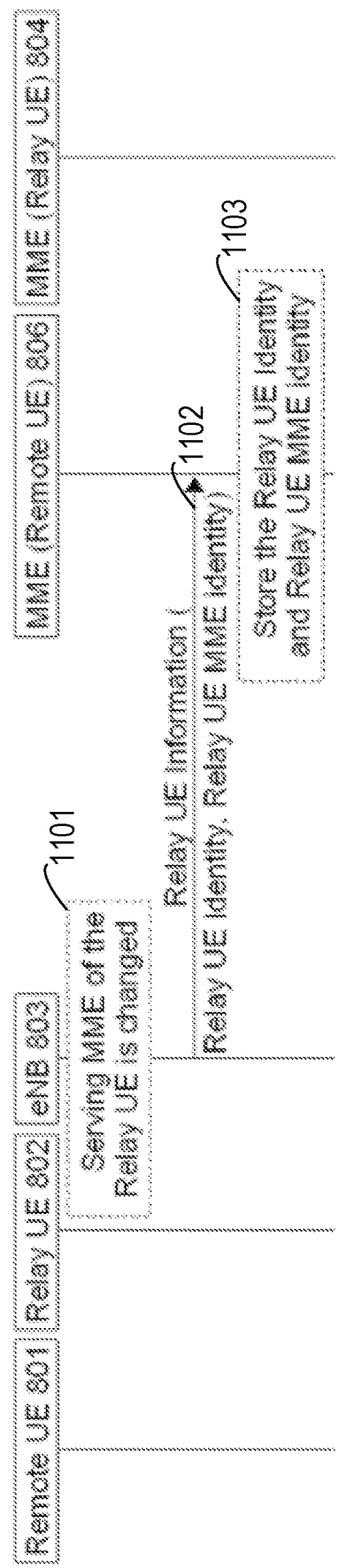
FIG. 11 illustrates signalling in a network.

FIG. 11 shows a second example of the first alternative, in which the eNB 803 informs the MME 806 of the relay UE information in a separate message.

Thus, for example in a situation in which the serving MME of the Relay UE 802 is changed at step 1101, in step 1102 the eNB 803 sends to the MME 806 that is serving the Remote UE 801 a message containing information about the Relay UE 802. For example, the message may contain the identity of the Relay UE 802 and the identity of the MME 804 serving the Relay UE. At step 1103, the MME 806 that is serving the Remote UE 801 stores the information about the Relay UE 802. It should be understood that the eNB 803 may at any time send the information corresponding to the content of the Relay UE information in the message in step 1102. It should also be understood that the information in the Relay UE Information message may also be contained in a different type of message, such as a handover required message or any other message.

In a similar way as in FIG. 11, the eNB 803 may also inform the MME 806 when the Remote UE 801 stops to use the Relay UE 802, for example when the Remote UE 801 stops to use evolved UE-to-Network relaying or when it starts to use a different Relay UE, also known as Relay UE reselection. Also in this case it should be understood that the information in the Relay UE Information message may also be contained in a different type of message, such as a handover required message or any other message.

Figure 12:
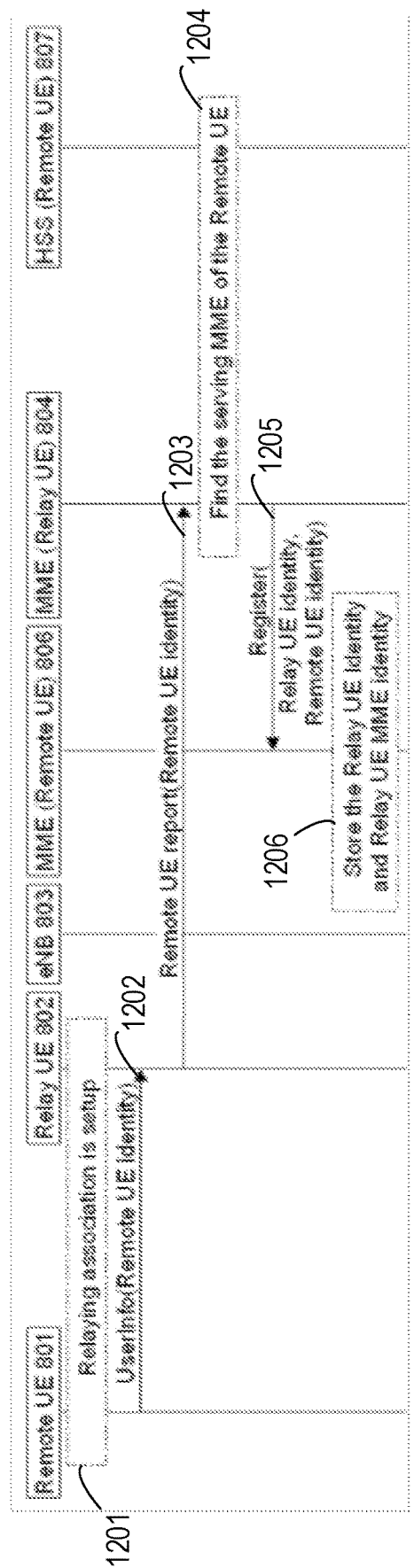
FIG. 12 illustrates signalling in a network.

FIG. 12 shows a second alternative, which uses the existing Remote UE Report message from the Relay UE 802 to the MME 804.

Thus, after the relaying relationship has been set up at steps 1201 and 1202, and the Relay UE 802 has sent the Remote UE Report message to the MME 804 at step 1203, the MME 804 serving the Relay UE sends a message at step 1205 to the MME 806 serving the Remote UE. The message sent at step 1205 contains, for example, the identities of the Remote UE 801 and the Relay UE 802. At step 1206, the MME 806 serving the Remote UE stores the information contained in the message sent at step 1205.

Figure 13:
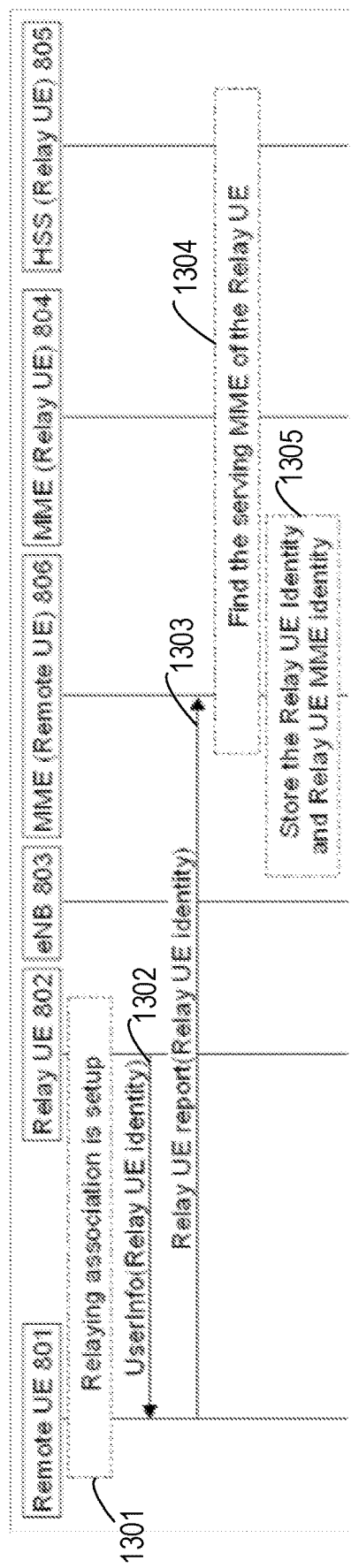
FIG. 13 illustrates signalling in a network.

FIG. 13 shows a third alternative, in which the Remote UE sends a Relay UE Report message to the MME 806.

Thus, after the relaying relationship has been set up at steps 1301 and 1302, the Remote UE 801 sends the Relay UE Report message to the MME 806 at step 1303. The message sent at step 1303 contains, for example, the identity of the Relay UE 802. At step 1305, the MME 806 serving the Remote UE stores the information concerning the identities of the Remote UE 801 and the Relay UE 802.

In a fourth alternative, a list of potential relay UEs for a given remote UE 801 is stored persistently in a network node e.g. HSS 807, or ProSe-F 811, or both, and then sent to the MME 806, for example each time when the Remote UE 801 performs Attach, i.e. enters EMM-REGISTERED state, or when the Remote UE 801 registers with the ProSe-F 801.

In one example, this information may be created as part of a pairing procedure, e.g. between the Remote UE 801 and the Relay UE 802.

In another example, the information is updated each time when the remote UE 801 connects via a relay UE, such as the Relay UE 802. In this way, the list of potential relay UEs is created dynamically, but stored persistently.

In yet another example, the information may be part of the subscription data for the Remote UE 801 stored in a network node such as the HSS 807.

There are different possible ways to transmit the data to the Remote UE 801. Which method is to be used depends on the combination of states of the Remote UE 801 and the Relay UE 802. When both Remote UE 801 and Relay UE 802 are in connected mode (RRC_CONNECTED, ECM-CONNECTED), the downlink data can be sent directly to the Remote UE 801, via the Relay UE 802, and this is not described further here.

The procedures described below assume that a single relay UE, Relay UE 802, is stored in the network node (e.g. MME 806). The case when there are multiple relay UEs stored is discussed later.

Figure 14B:
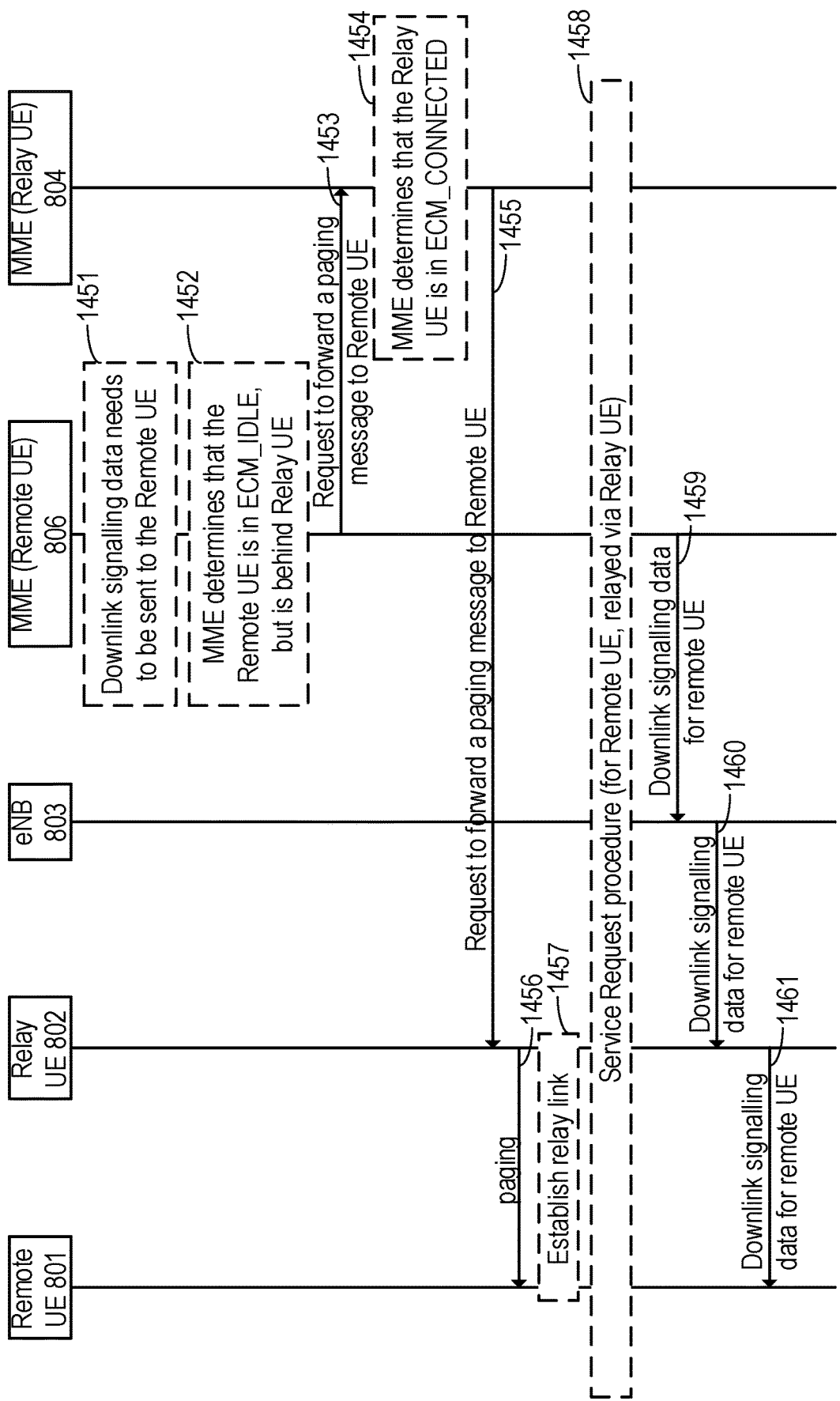
FIGS. 14(a)(1), 14(a)(2) and 14(b) illustrate signaling in a network.

A first example of a first procedure is shown in FIGS. 14(*a*)1 and 14(*a*)(2), which applies when the Relay UE 802 is in connected mode (RRC_CONNECTED, ECM-CONNECTED), and the Remote UE 801 is in idle mode.

Turning to FIG. 14(*a*)(1), in steps 1401, 1402 and 1403, the MME 806 serving the Remote UE is notified that there is downlink data for the Remote UE 801, which is in idle mode. FIGS. 14(*a*)(1) (and 14(*a*)(2)) shows the situation where user data arrives from the external network 810, which is the case in this first example, but the procedure applies equally when the data is signalling data arriving via the external network 810, such as signalling from the ProSe-F.

In step 1405, the MME 806 determines that the Remote UE is in an idle mode, for example ECM-IDLE, but is behind the Relay UE 802. At step 1406, the MME 806 therefore sends to the MME 804 serving the Relay UE a request to forward a paging message to the Remote UE.

In step 1407, the MME 804 receives the request, and determines that the Relay UE 802 is in a connected mode, for example ECM-CONNECTED.

In step 1408, the MME 804 sends to the Relay 802 a request to forward a paging message to the Remote UE 801. Turning to FIG. 14(*a*)(2), the paging message is forwarded at step 1409, the relay link is established at step 1410, and the service request procedure is performed at step 1411.

Then the downlink data can be sent from the SGW 808 to the Remote UE 801 via the Relay UE 802 in steps 1412, 1413 and 1414.

A second example of a first procedure is shown in FIG. 14(*b*), which applies when the Relay UE 802 is in connected mode (RRC_CONNECTED, ECM-CONNECTED), and the Remote UE 801 is in idle mode. In this second example, a network node, for example the MME 806 determines in step 1451 that it has signalling data, for example a NAS signalling message, which needs to be sent to the Remote UE 801.

In step 1452, the MME 806 determines that the Remote UE is in an idle mode, for example ECM-IDLE, but is behind the Relay UE 802. At step 1453, the MME 806 therefore sends to the MME 804 serving the Relay UE a request to forward a paging message to the Remote UE.

In step 1454, the MME 804 receives the request, and determines that the Relay UE 802 is in a connected mode, for example ECM-CONNECTED.

In step 1455, the MME 804 sends to the Relay 802 a request to forward a paging message to the Remote UE 801.

The paging message is forwarded at step 1456, the relay link is established at step 1457, and the service request procedure is performed at step 1458.

Then the downlink signalling from the MME 806 can be sent to the Remote UE 801 via the Relay UE 802 in steps 1459, 1460 and 1461.

It should be understood that this procedure applies equally also when the eNB 803 has signalling data to be sent to the Remote UE 801. It this case the eNB 803 may trigger the MME 806, e.g. with a signalling message as the very first step.

Figure 15B:
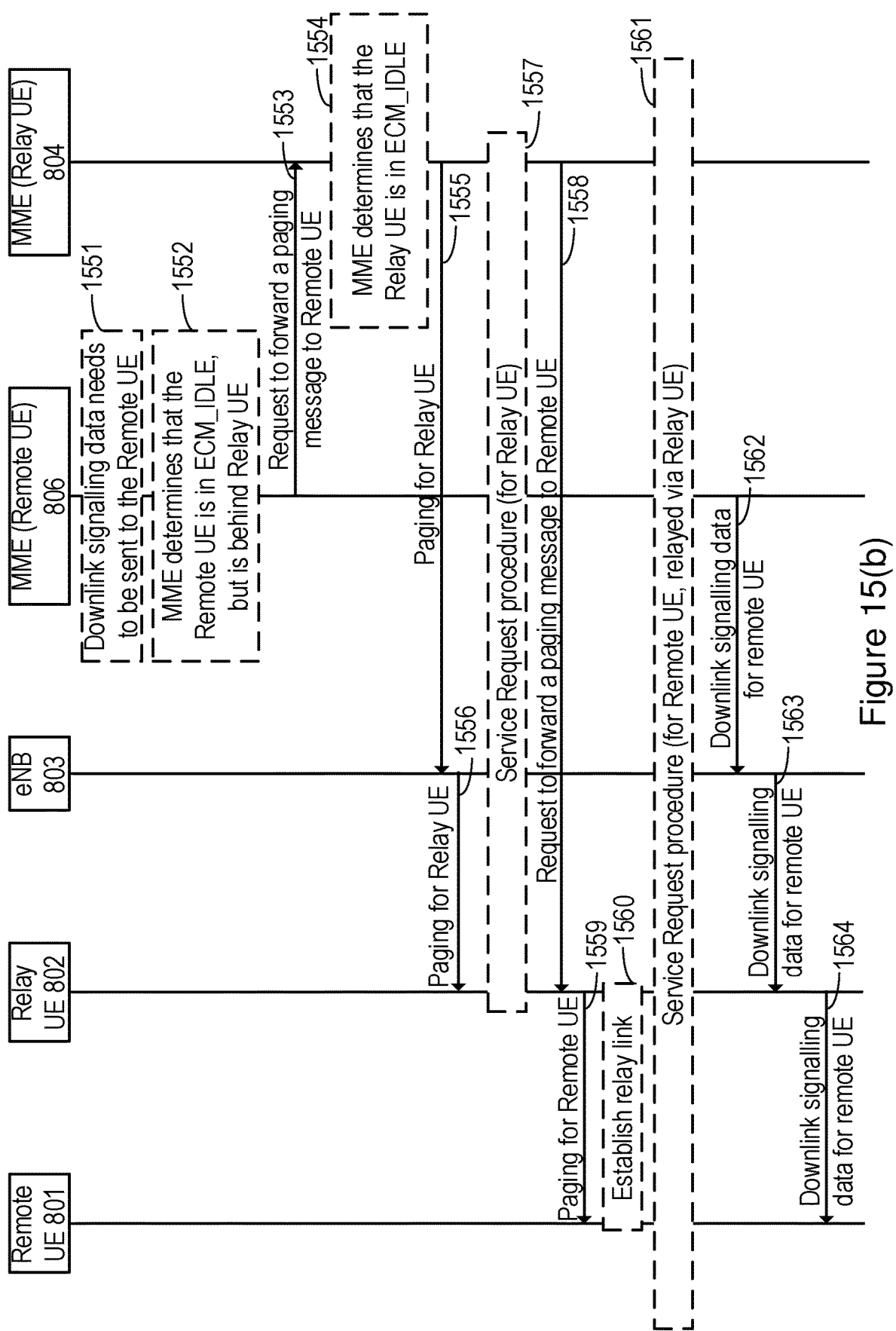
FIGS. 15(a)(1), 15(a)(2) and 15(b) illustrate signaling in a network.

A first example of a second procedure is shown in FIGS. 15(*a*)1( ) and 15(*a*)(2), which applies when the Relay UE 802 is in idle mode (RRC_IDLE, ECM-IDLE), and the Remote UE 801 is 30 in idle mode.

Turning to FIG. 15(*a*)(1), in steps 1501, 1502 and 1503, the MME 806 serving the Remote UE is notified that there is downlink data for the Remote UE 801, which is in idle mode. FIGS. 15(*a*)(1) (and 15(*a*)(2)) shows the situation where user data arrives from the external network 810, which is the case in this first example but the procedure applies equally when the data is signalling data arriving via the external network 810, such as signalling from the ProSe-F.

In step 1505, the MME 806 determines that the Remote UE is in an idle mode, for example ECM-IDLE, but is behind the Relay UE 802. At step 1506, the MME 806 therefore sends to the MME 804 serving the Relay UE a request to forward a paging message to the Remote UE.

In step 1507, the MME 804 receives the request, and determines that the Relay UE 802 is in an idle mode, for example ECM_IDLE.

In step 1508, the MME 804 sends to the eNB 803 a paging message for the Relay UE 802, and Turning to FIG. 15(*a*) (2), in step 1509 the eNB 803 pages the Relay UE 802. The service request procedure for the Relay UE 802 is performed at step 1510.

Then, at step 1511, the MME 804 sends to the Relay UE 802 a request to forward a paging message to the Remote UE 801. The paging message is forwarded at step 1512, the relay link is established at step 1513, and the service request procedure is performed at step 1514, relayed via the Relay UE.

Then the downlink data can be sent from the SGW 808 to the Remote UE 801 via the Relay UE in steps 1515, 1516 and 1517.

Thus, with the Relay UE in idle mode, the Relay UE is paged by the MME serving the Relay UE, using the paging occasions used by the Relay UE.

A second example of a second procedure is shown in FIG. 15(*b*), which applies when the Relay UE 802 is in idle mode (RRC_IDLE, ECM-IDLE), and the Remote UE 801 is in idle mode. In this second example, a network node, for example the MME 806 determines at step 1551 that it has signalling data, for example a NAS signalling message, which needs to be sent to the Remote UE 801.

In step 1552, the MME 806 determines that the Remote UE is in an idle mode, for example ECM-IDLE, but is behind the Relay UE 802. At step 1553, the MME 806 therefore sends to the MME 804 serving the Relay UE a request to forward a paging message to the Remote UE.

In step 1554, the MME 804 receives the request, and determines that the Relay UE 802 is in an idle mode, for example ECM_IDLE.

In step 1555, the MME 804 sends to the eNB 803 a paging message for the Relay UE 802, and in step 1556 the eNB 803 pages the Relay UE 802. The service request procedure for the Relay UE 802 is performed at step 1557.

Then, at step 1558, the MME 804 sends to the Relay UE 802 a request to forward a paging message to the Remote UE 801. The paging message is forwarded at step 1559, the relay link is established at step 1560, and the service request procedure is performed at step 1561, relayed via the Relay UE.

Then the downlink signalling from the MME 806 can be sent to the Remote UE 801 via the Relay UE 802 in steps 1562, 1563 and 1564.

It should be understood that this procedure applies equally also when the eNB 803 has signalling data to be sent to the Remote UE 801. It this case the eNB 803 may trigger the MME 806, e.g. with a signalling message as the very first step.

Figure 16B:
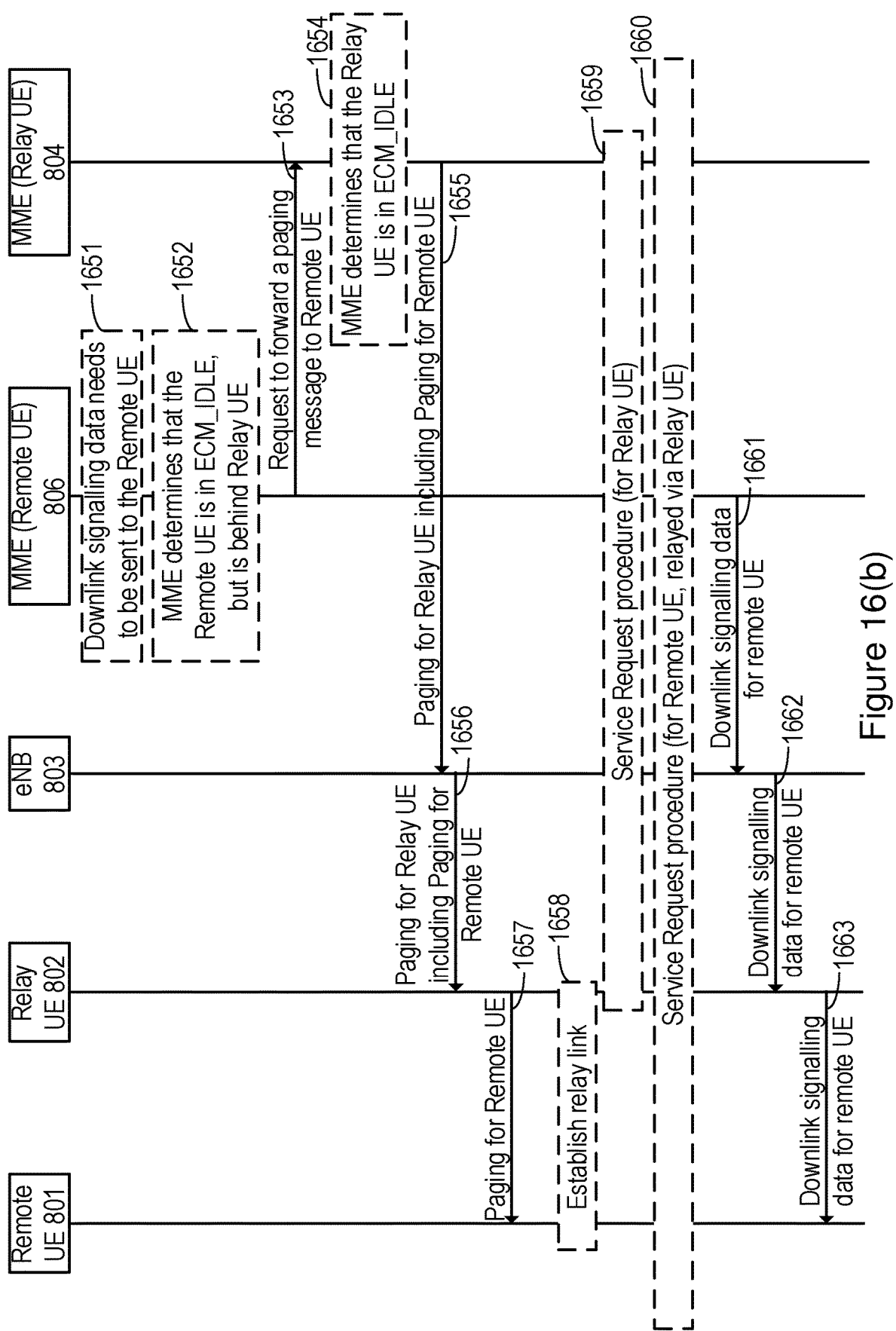
FIGS. 16(a)(1), 16(a)(2) and 16(b) illustrate signaling in a network.

FIGS. 16(*a*)(1) and 16(*a*)(2) show an alternative embodiment of the first example this second procedure, which again applies when the Relay UE 802 is in idle mode (RRC_IDLE, ECM-IDLE), and the Remote UE 801 is in idle mode.

Turning to FIG. 16(*a*)(1), in steps 1601, 1602 and 1603, the MME 806 serving the Remote UE is notified that there is downlink data for the Remote UE 801, which is in idle mode. FIGS. 16(*a*)(1) (and 16(*a*)(2)) shows the situation where the data arrives from the external network 810, which is the case in this first example but the procedure applies equally when the data is signalling data arriving via the external network 810, such as signalling from the ProSe-F.

In step 1605, the MME 806 determines that the Remote UE is in an idle mode, for example ECM-IDLE, but is behind the Relay UE 802. At step 1606, the MME 806 therefore sends to the MME 804 serving the Relay UE a request to forward a paging message to the Remote UE.

In step 1607, the MME 804 receives the request, and determines that the Relay UE 802 is in an idle mode, for example ECM-IDLE.

In step 1608, the MME 804 sends to the eNB 803 a paging message for the Relay UE 802, including paging for the Remote UE 801. Turning to FIG. 16(*a*)(2), in step 1609, the eNB 803 sends this paging message for the Relay UE 802, including paging for the Remote UE 801, to the Relay UE 802.

In step 1610, the Relay UE 802 pages the Remote UE 801, and the relay link is established at step 1611.

The service request procedure for the Relay UE 802 is performed at step 1612, and the service request procedure for the Remote UE 801 is performed at step 1613, relayed via the Relay UE.

Then the downlink data can be sent from the SGW 808 to the Remote UE 801 via the Relay UE in steps 1614, 1615 and 1616.

In this embodiment, in step 1609 a paging message is sent to the Relay UE 802, using the paging occasions of the Relay UE 802. This paging message includes both the identity of the Relay UE 802 as well as the identity of the Remote UE 801. When the Relay UE 802 receives the message, it determines based on the contents of the paging message, that it should forward a paging notification to the Remote UE 801.

FIG. 16(*b*) shows the alternative embodiment in the second example of the second procedure, which applies when the Relay UE 802 is in idle mode (RRC_IDLE, ECM-IDLE), and the Remote UE 801 is in idle mode. In this second example, a network node, for example the MME 806 determines at step 1651 that it has signalling data, for example a NAS signalling message, which needs to be sent to the Remote UE 801.

In step 1652, the MME 806 determines that the Remote UE is in an idle mode, for example ECM-IDLE, but is behind the Relay UE 802. At step 1653, the MME 806 therefore sends to the MME 804 serving the Relay UE a request to forward a paging message to the Remote UE.

In step 1654, the MME 804 receives the request, and determines that the Relay UE 802 is in an idle mode, for example ECM-IDLE.

In step 1655, the MME 804 sends to the eNB 803 a paging message for the Relay UE 802, including paging for the Remote UE 801. In step 1656, the eNB 803 sends this paging message for the Relay UE 802, including paging for the Remote UE 801, to the Relay UE 802.

In step 1657, the Relay UE 802 pages the Remote UE 801, and the relay link is established at step 1658.

The service request procedure for the Relay UE 802 is performed at step 1659, and the service request procedure for the Remote UE 801 is performed at step 1660, relayed via the Relay UE.

Then the downlink signalling from the MME 806 can be sent to the Remote UE 801 via the Relay UE 802 in steps 1661, 1662 and 1663.

It should be understood that this procedure applies equally also when the eNB 803 has signalling data to be sent to the Remote UE 801. It this case the eNB 803 may trigger the MME 806, e.g. with a signalling message as the very first step.

Figure 17:
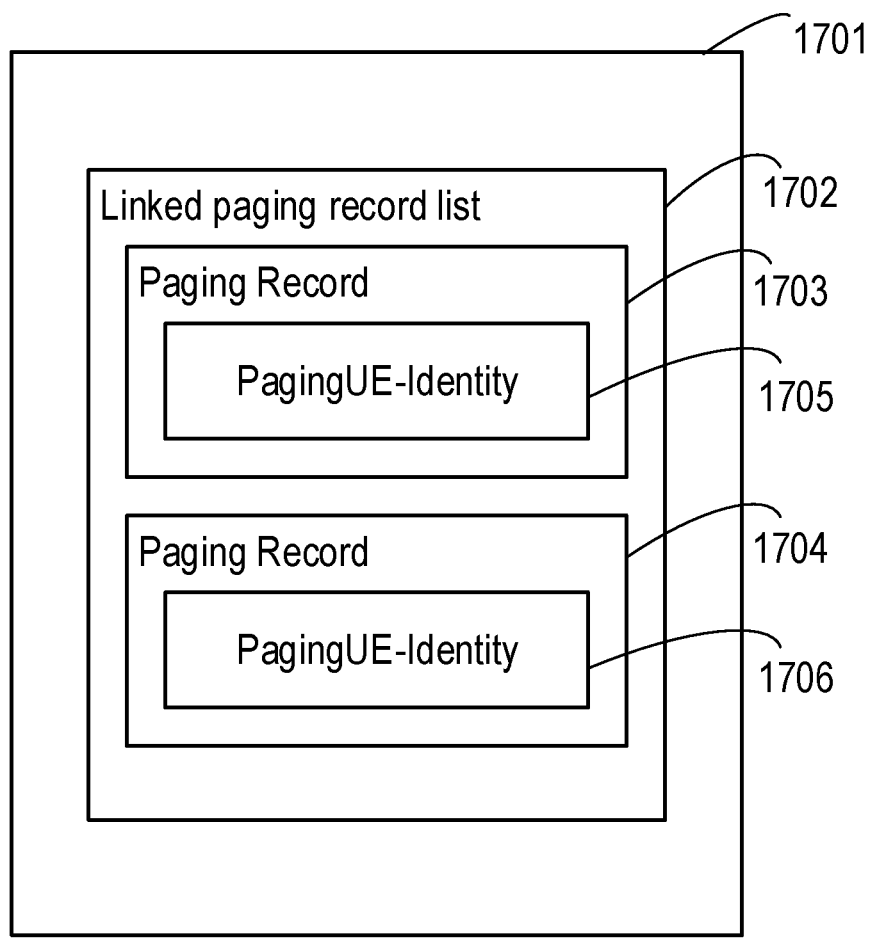
FIG. 17 illustrates a form of a message sent in the signalling of FIG. 16.

FIG. 17 illustrates a possible format of the paging message 1701 sent in step 1609. In this example, the message 1701 contains a linked paging record list 1702, which contains a first paging record 1703 and a second paging record 1704. The first paging record 1703 contains an identity 1705 of a first UE to be paged, while the second paging record 1704 contains an identity 1706 of a second UE to be paged. In this example, the first UE to be paged is the Relay UE 802, and the second UE to be paged is the Remote UE 801.

When the Relay UE 802 receives the message 1701, and determines its own identity as the first item in the list, it forwards a paging notification to all the UEs whose identities are included in the rest of the list, assuming these are Remote UEs served by this Relay UE 802, such as the Remote UE 801.

Figure 18:
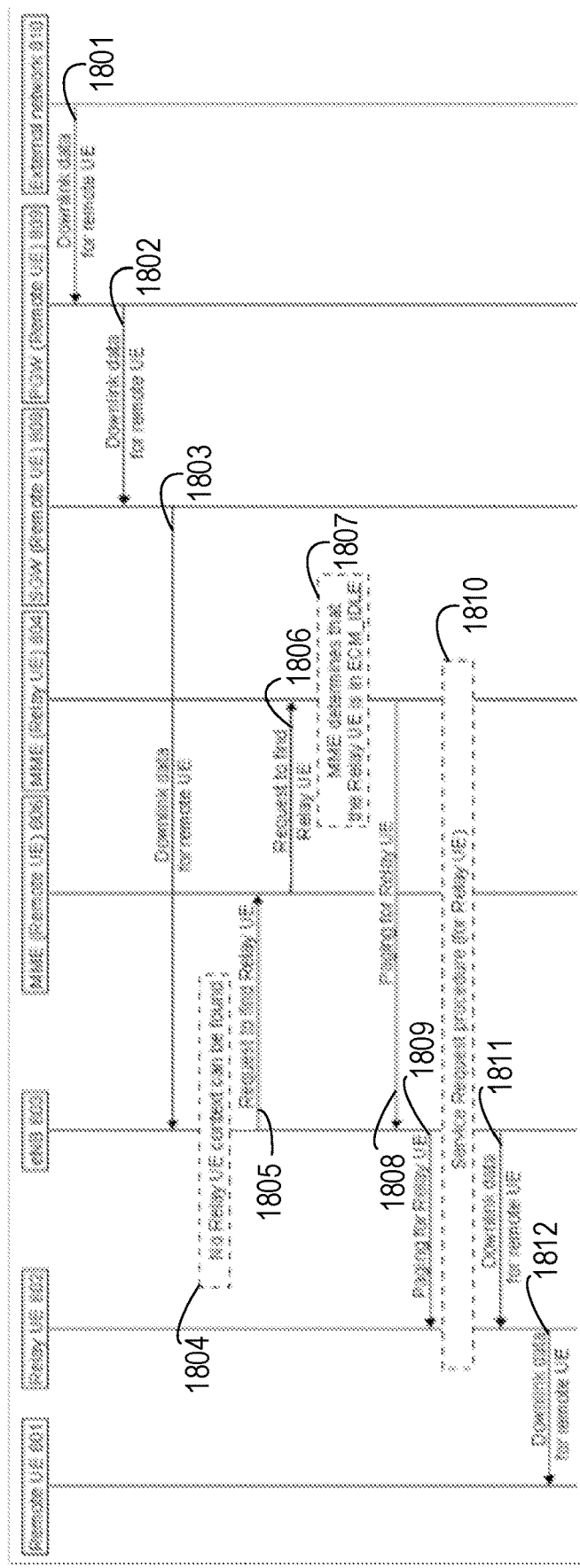
FIG. 18 illustrates signalling in a network.

A third procedure is shown in FIG. 18, which applies when the Relay UE 802 is in idle mode (RRC_IDLE, ECM-IDLE), and the Remote UE 801 is in connected mode.

In steps 1801 and 1802, SGW 808 serving the Remote UE is notified that there is downlink data for the Remote UE 801. FIG. 18 shows the situation where the data arrives from the external network 810, but the procedure applies equally when the data is signalling data. Because the Remote UE is in connected mode, the SGW 808 is able to send the data to the eNB 803 serving the Remote UE 801. Thus, the eNB 803 determines that there is data to be sent to the Remote UE.

In step 1804, the eNB 803 determines that no Relay UE context can be found. At step 1805, the eNB 803 sends a request to the MME 806 serving the Remote UE for the Relay UE to be found. This request is sent because there is a need to send the data to the Remote UE, and it is necessary to find the Relay UE to allow the data to be sent to the Remote UE using the Relay UE. At step 1806, the MME 806 serving the Remote UE uses the stored information about one or more UE that may be used as a relay by the first UE, and sends a request to the MME 804 serving the Relay UE to find the Relay UE.

In step 1807, the MME 804 receives the request, and determines that the Relay UE 802 is in an idle mode, for example ECM-IDLE.

In step 1808, the MME 804 sends to the eNB 803 a paging message for the Relay UE 802, and in step 1809 the eNB 803 pages the Relay UE 802. The service request procedure for the Relay UE 802 is performed at step 1810.

Then, at step 1811, the eNB 803 sends the downlink data for the Remote UE 801 to the Relay UE 802 and, at step 1812, the Relay UE 802 forwards the downlink data to the Remote UE 801.

Thus, with the Relay UE in idle mode, the Relay UE is paged by the MME serving the Relay UE, using the paging occasions used by the Relay UE.

As mentioned above, the procedures shown in FIGS. 14, 15 and 16, and 18 assume that there is a single potential Relay UE. However, when the Remote UE 801 connects to a Relay UE it may at some point, for example due to inactivity, enter idle mode.

When in idle mode, a UE, such as the Remote UE 801, shall perform a Tracking Area Update, for example when it enters a cell belonging to a different tracking area from the previous serving cell.

If the new Relay UE is in the same Tracking Area (or even cell) as the previous Relay UE 802, then the Remote UE 801 would not need to perform a Tracking Area Update after switching to the new Relay UE, and tis would reduce the signalling load on the network and save some power in the UE. Thus, when the Remote UE 801 is in idle mode, and switches from using Relay UE 802 to using a different Relay UE, it will not necessarily inform the network of this, since it is in idle mode. Then, when DL traffic arrives in the PGW 809 from the external network 810, the MME 806 will not necessarily know which Relay UE is in use.

In one alternative, the MME 806 first attempts to page the Remote UE 801 via the Relay UE which the Remote UE 801 last used before it entered idle mode. The information about this Relay UE may have been obtained by the MME 806 using one of the methods described above, and illustrated in FIGS. 10, 11, 12 and 13. Assuming the Remote UE 801 is in idle mode, then, depending on the state of this Relay UE, either the procedure shown in FIG. 14 or that shown in FIG. 15 or 16 may be used.

In another alternative, the MME 806 obtains a list of potential relay UEs for a given remote UE 801, for example using the fourth alternative method for obtaining information about potential relay UEs, as described above. The intention is that, with high probability, the Relay UE 802 which currently serves the Remote UE 801 is in the set of potential Relay UEs.

From this set of potential Relay UEs, the MME 806 then creates a subset, defined here as the set of eligible Relay UEs.

The procedures shown in FIGS. 14, 15 and 16, and 18 may then be used, but applied for each eligible relay UE. In particular, the request message 1406, 1506, 1606 or 1806 from the MME 806 to the MME 804 is repeated for each eligible Relay UE, and so the relevant actions are triggered by each MME receiving that message.

In one example, all Relay UEs in the set of potential Relay UEs are eligible. In another example, all Relay UEs which currently are located in the same Tracking Area as the Remote UE are eligible. In this case, the MME 806 needs to include the Tracking Area identity in the request message 1406, 1506, 1606 or 1806 to the MME serving the particular candidate eligible Relay UE, and then the MME only proceeds when the Relay UE is located in that tracking area.

It is likely that a single Remote UE only has a few eligible Relay UEs, for example a few smartphones owned, operated, or controlled by the same user, subscriber, or group of subscribers (for example a family) and it is not likely that a multitude of eligible Relay UEs are in the vicinity of the Remote UE simultaneously.

If there are a very large group of eligible Relay UEs for a single Remote UE (for example if a company designates all smartphones as eligible relays to a multitude of sensors), additional rules, information, and heuristics can be applied to limit the search of possible Relay UEs, for instance using location data or information about previous connections.

Figure 19:
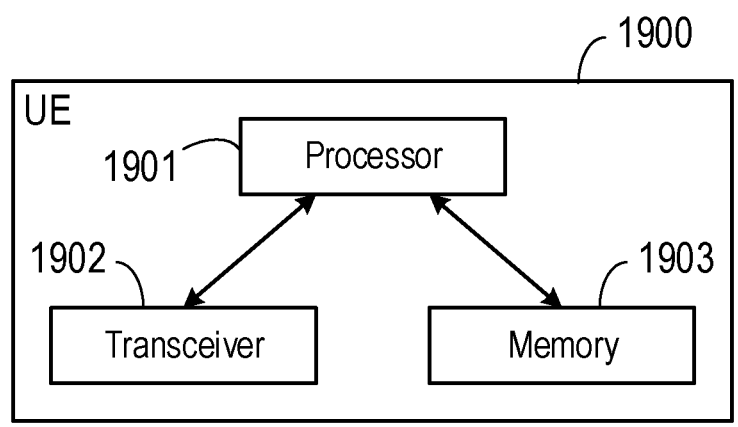
FIG. 19 shows a user equipment for use in aspects of the invention.

FIG. 19 shows a user equipment 2500 that can be adapted or configured to operate according to one or more of the non-limiting example embodiments described, either as a remote UE or as a relay UE as described herein. Of course, a single UE will typically be able to act as a remote UE or as a relay UE, as the circumstances dictate. The UE 2500 comprises a processor or processing unit 2501 that controls the operation of the device 2500. The processor 2501 is connected to a transceiver 2502 (which comprises a receiver and a transmitter) with associated antenna(s) and is used to transmit signals to and receive signals from nodes in the network or from other UEs. The UE 2500 also comprises a memory or memory unit 2503 that is connected to the processor 2501 and that contains instructions or computer code executable by the processor 2501 and other information or data required for the operation of the UE 2500 in accordance with the methods described herein.

Figure 20:
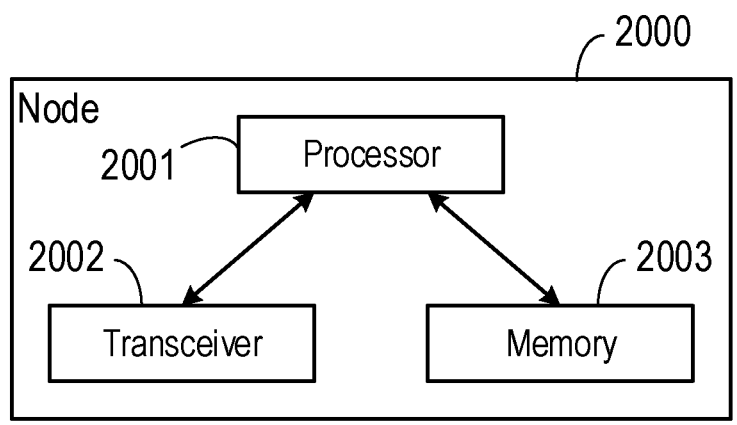
FIG. 20 shows a network node for use in aspects of the invention.

FIG. 20 shows a network node, for example a radio access network node such as an eNB, or a Mobility Management Entity, 2600 that can be adapted or configured to operate according to one or more of the non-limiting example embodiments described. The illustrated network node may serve either a remote UE or a relay UE as described herein. Of course, a single network node will typically be able to serve many UEs simultaneously, and one or more of these UEs may be acting as a remote UE while one or more other UE is acting as a relay UE, as the circumstances dictate. The node 2600 comprises a processor or processing unit 2601 that controls the operation of the node 2600. The processor 2601 is connected to a transceiver 2602 (which comprises a receiver and a transmitter) with associated antenna(s) and network interfaces, and is used to transmit signals to and receive signals from other nodes in the network or from UEs. The node 2600 also comprises a memory or memory unit 2603 that is connected to the processor 2601 and that contains instructions or computer code executable by the processor 2601 and other information or data required for the operation of the node 2600 in accordance with the methods described herein.

Figure 21:
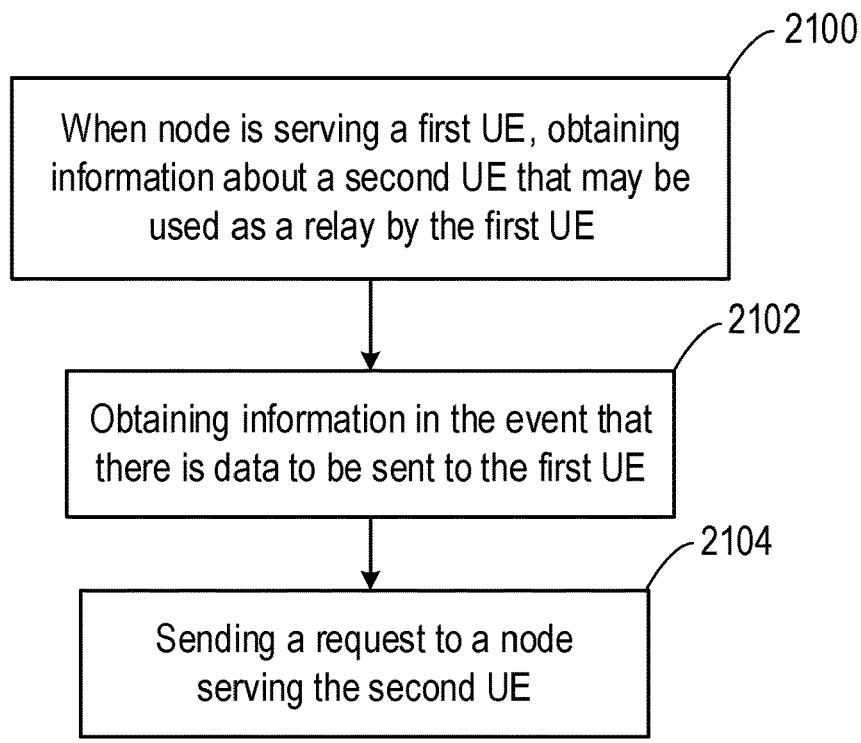
FIG. 21 is a flow chart, illustrating a method performed in a network node.

FIG. 21 is a flow chart, illustrating a method performed in a network node. When the node is serving a first UE, at step 2100 it obtains information about a second UE that may be used as a relay by the first UE. At step 2102, the node obtains information in the event that there is data to be sent to the first UE. At step 2104, the node sends a request to a node serving the second UE.

Figure 22:
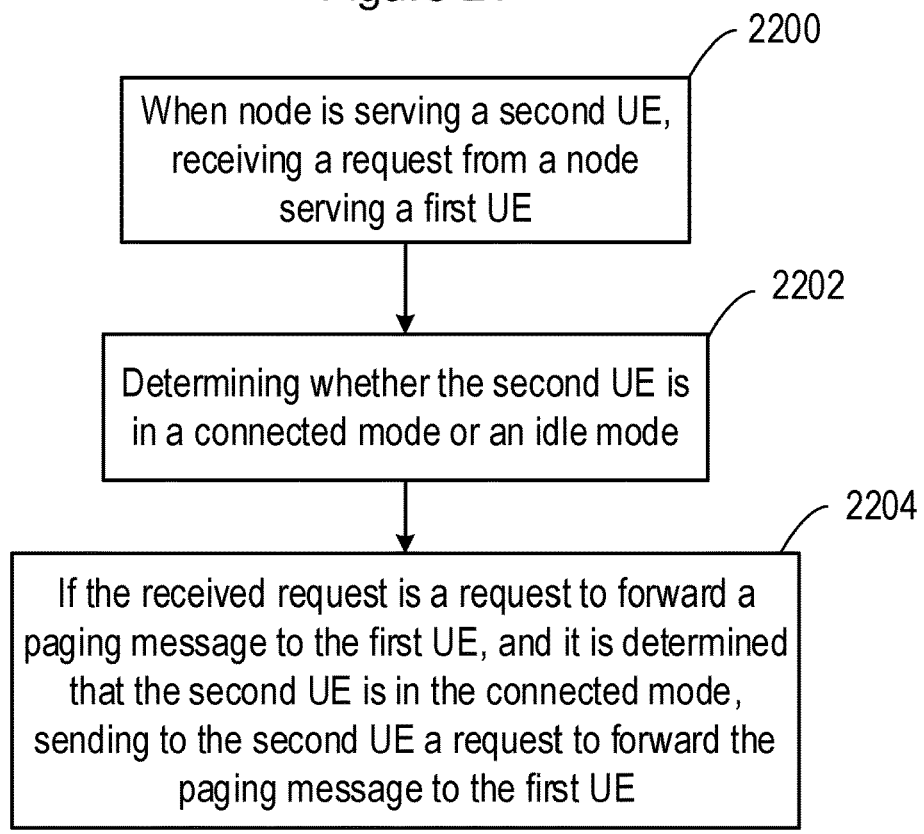
FIG. 22 is a flow chart illustrating a method performed in a network node.

FIG. 22 is a flow chart illustrating a method performed in a network node. When the node is serving a second UE, at step 2200, it receives a request from a node serving a first UE. At step 2202, it determines whether the second UE is in a connected mode or an idle mode. If the received request is a request to forward a paging message to the first UE, and it is determined that the second UE is in the connected mode, at step 2204 the node sends to the second UE a request to forward the paging message to the first UE.

Figure 23:
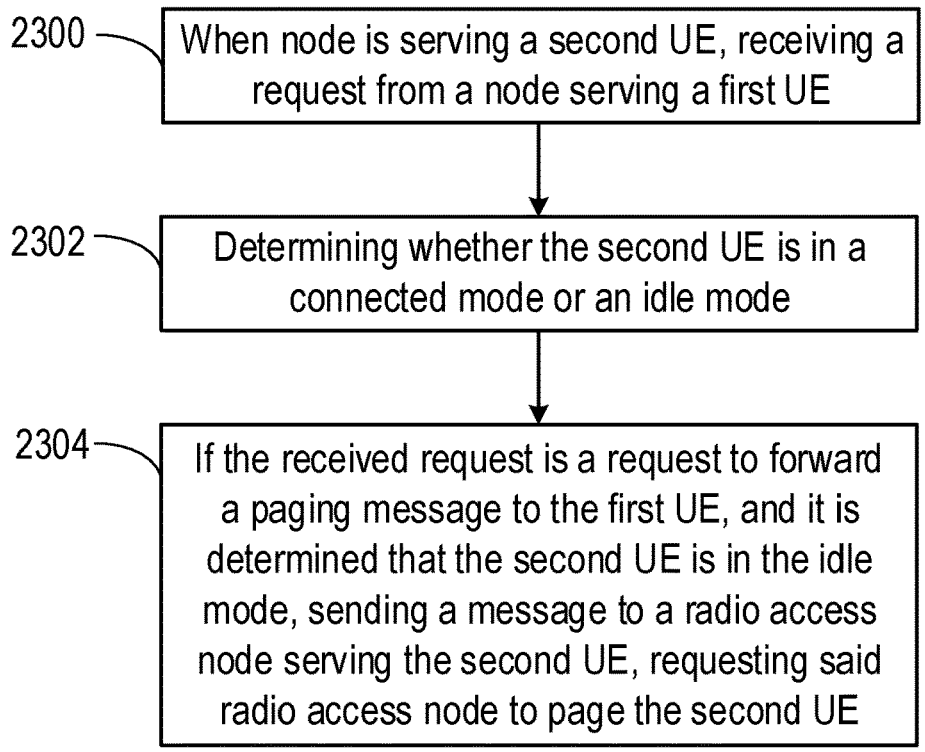
FIG. 23 is a flow chart illustrating a method performed in a network node.
Figure 24:
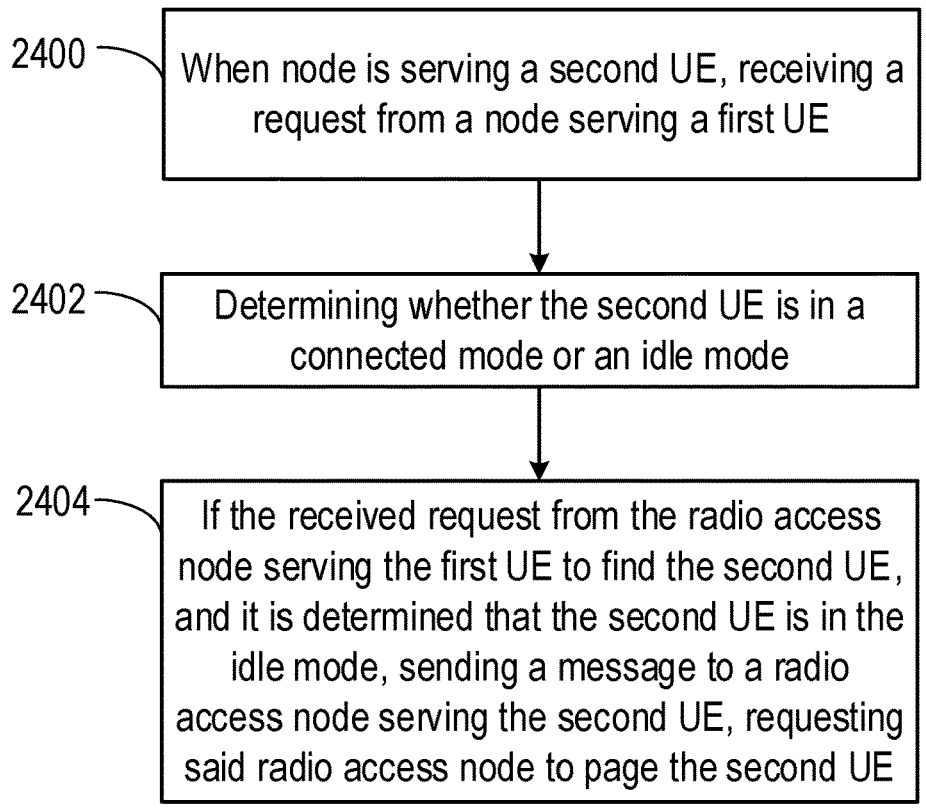
FIG. 24 is a flow chart illustrating a method performed in a network node.
Figure 25:
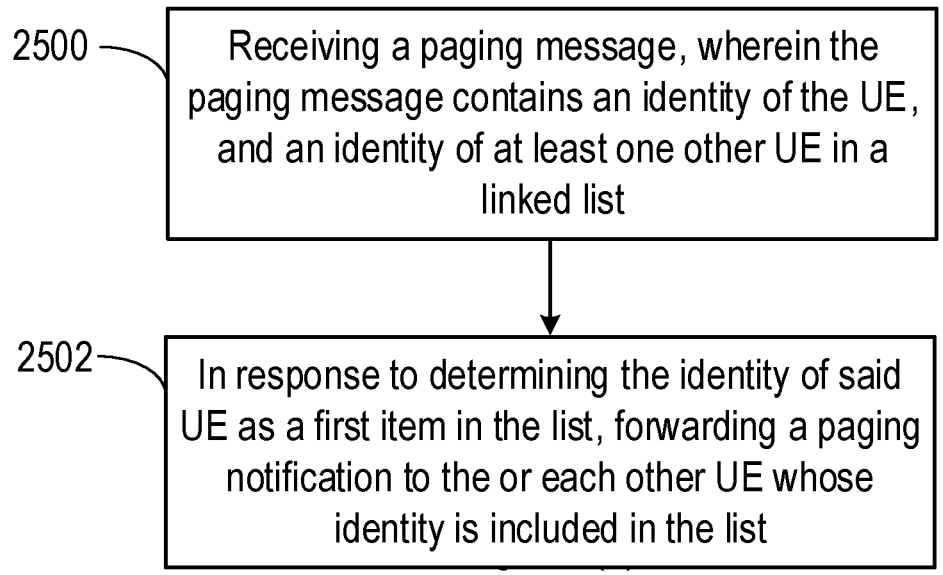
FIG. 25 is a flow chart illustrating a method performed in a UE.

FIG. 23 is a flow chart illustrating a method performed in a network node. When the node is serving a second UE, at step 2300 it receives a request from a node serving a first UE. At step 2302 it determines whether the second UE is in a connected mode or an idle mode. If the received request is a request to forward a paging message to the first UE, and it is determined that the second UE is in the idle mode, at step 2304 the node sends a message to a radio access node serving the second UE, requesting said radio access node to page the second UE FIG. 24 is a flow chart illustrating a method performed in a network node. When the node is serving a second UE, at step 2400 it receives a request from a node serving a first UE. At step 2402, it determines whether the second UE is in a connected mode or an idle mode. If the received request is a request from the radio access node serving the first UE to find the second UE, and it is determined that the second UE is in the idle mode, at step 2404 the node sends a message to a radio access node serving the second UE, requesting said radio access node to page the second UE FIG. 25 is a flow chart illustrating a method performed in a UE. At step 2500 the UE receives a paging message, wherein the paging message contains an identity of the UE, and an identity of at least one other UE in a linked list. At step 2502, in response to determining the identity of said UE as a first item in the list, the UE forwards a paging notification to the or each other UE whose identity is included in the list.

Figure 26:
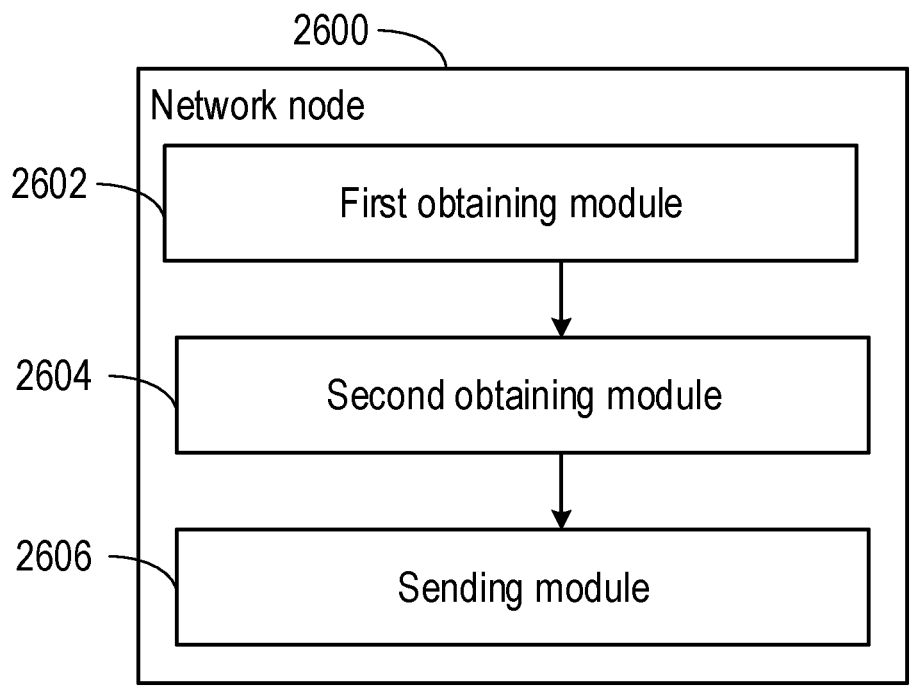
FIG. 26 illustrates a form of a node in a cellular communications network.

FIG. 26 illustrates a form of a node 2600 in a cellular communications network. The node comprises: a first obtaining module 2602 for, when said node is serving a first User Equipment, UE, obtaining information about a second UE that may be used as a relay by the first UE; a second obtaining module 2604 for obtaining information in the event that there is data to be sent to the first UE; and a sending module 2606 for sending a request to a node serving the second UE.

Figure 27:
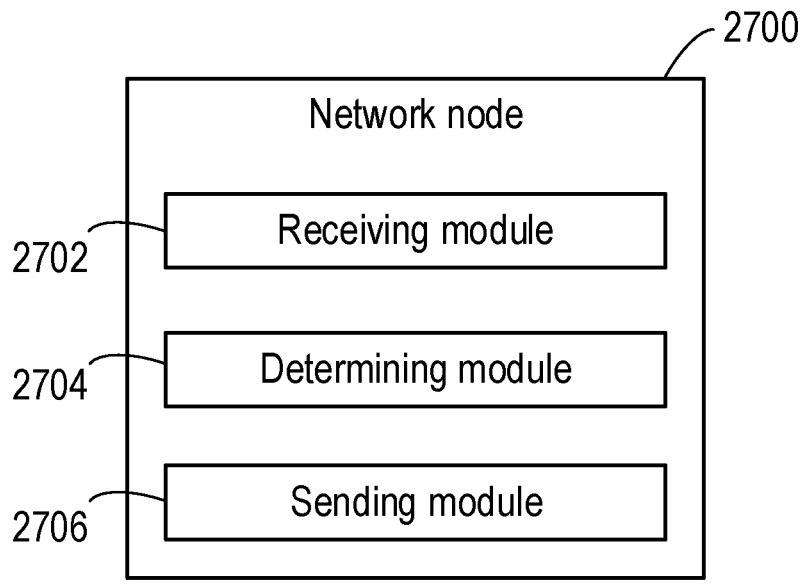
FIG. 27 illustrates a form of a node in a cellular communications network.

FIG. 27 illustrates a form of a node 2700 in a cellular communications network. The node comprises: a receiving module 2702 for, when said node is serving a second User Equipment, UE, receiving a request from a node serving a first UE; a determining module 2704 for determining whether the second UE is in a connected mode or an idle mode; and a sending module 2706 for, if the received request is a request to forward a paging message to the first UE, and it is determined that the second UE is in the connected mode, sending to the second UE a request to forward the paging message to the first UE.

Figure 28:
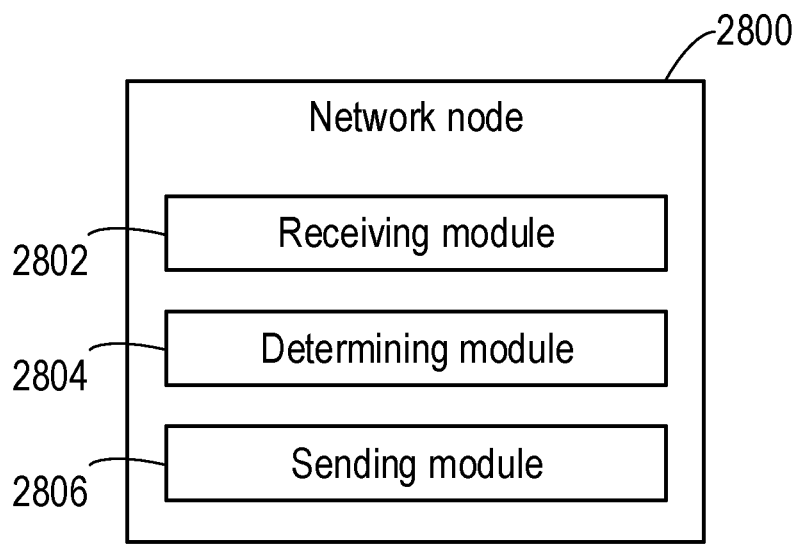
FIG. 28 illustrates a form of a node in a cellular communications network.

FIG. 28 illustrates a form of a node 2800 in a cellular communications network. The node comprises: a receiving module 2802 for, when said node is serving a second User Equipment, UE, receiving a request from a node serving a first UE; a determining module 2804 for determining whether the second UE is in a connected mode or an idle mode; and a sending module 2806 for, if the received request is a request to forward a paging message to the first UE, and it is determined that the second UE is in the idle mode, sending a message to a radio access node serving the second UE, requesting said radio access node to page the second UE.

Figure 29:
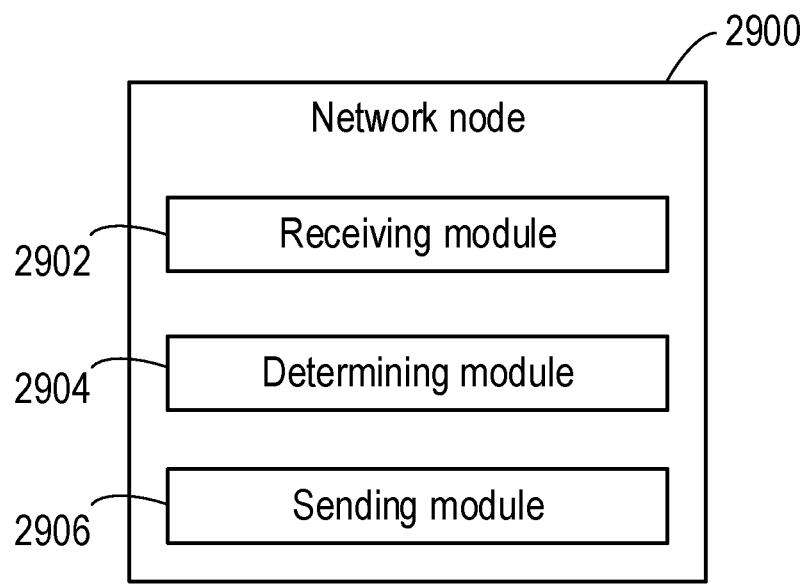
FIG. 29 illustrates a form of a node in a cellular communications network.

FIG. 29 illustrates a form of a node 2900 in a cellular communications network. The node comprises: a receiving module 2902 for, when said node is serving a second User Equipment, UE, receiving a request from a node serving a first UE; a determining module 2904 for determining whether the second UE is in a connected mode or an idle mode; and a sending module 2906 for, if the received request is a request from the radio access node serving the first UE to find the second UE, and it is determined that the second UE is in the idle mode, sending a message to a radio access node serving the second UE, requesting said radio access node to page the second UE.

Figure 30:
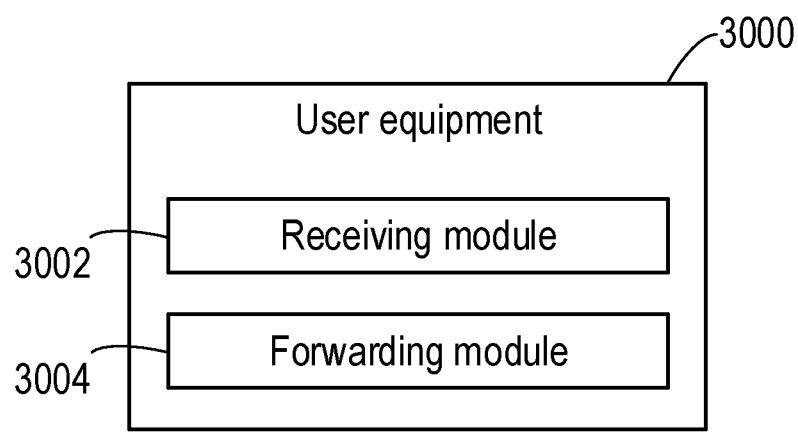
FIG. 30 illustrates a form of a UE.

FIG. 30 illustrates a form of a UE 3000. The UE comprises: a receiving module 3002, for receiving a paging message, wherein the paging message contains an identity of said UE, and an identity of at least one other UE in a linked list; and a forwarding module 3004 for, in response to determining the identity of said UE as a first item in the list, forwarding a paging notification to the or each other UE whose identity is included in the list.

Thus, there are described methods that deal with issues relating to mobility in the case of UE-to-Network relaying.

Novel methods, devices and network nodes are defined in the following embodiments.

The invention claimed is:

1. A method of operation of a first mobility management entity in a cellular communications network, the method comprising:
when said first mobility management entity is serving a first User Equipment, UE, obtaining information about a second UE that is being used as a relay by the first UE or that may be used as the relay by the first UE;
obtaining further information in the event that there is data to be sent to the first UE; and
responsive to there being data to be sent to the first UE:
sending a request to a second mobility management entity serving the second UE to forward a paging message to the first UE, in response to determining that the first UE is in an idle mode, and
sending downlink signalling to the first UE via the second UE.

2. A method according to claim 1, wherein the step of obtaining information about the second UE comprises:
receiving the information in a message from a radio access network, RAN, node serving the first UE.

3. A method according to claim 2, comprising:
receiving the information from the RAN node serving the first UE as part of a non-access stratum message.

4. A method according to claim 2, comprising:
receiving the information from the RAN node serving the first UE in a separate message containing the information.

5. A method according to claim 1, wherein the step of obtaining information about the second UE comprises:
receiving the information in a message from the second mobility management entity serving the second UE.

6. A method according to claim 1, wherein the step of obtaining information about the second UE comprises:
receiving the information in a message from the first UE.

7. A method according to claim 1, wherein obtaining the further information in the event that there is data to be sent to the first UE comprises receiving a notification from a core network node serving the first UE that there is data to be sent to the first UE.

8. A method according to claim 1, wherein obtaining the further information in the event that there is data to be sent to the first UE comprises receiving a request from a radio access network node serving the first UE.

9. A method according to claim 1, wherein obtaining the further information in the event that there is data to be sent to the first UE comprises determining that the first mobility management entity wishes to send signaling data to the first UE.

10. A method of operation of a second mobile management entity in a cellular communications network, the method comprising:
when said second mobile management entity is serving a second User Equipment, UE, that is being used as a relay by a first UE or that may be used as the relay by the first UE, receiving a first request from a first mobile management entity serving the first UE to one of forward a paging message to the first UE or find the second UE;
determining that the second UE is in a connected mode; and
if the received first request is a request to forward the paging message to the first UE, sending to the second UE a second request to forward the paging message to the first UE, in response to determining that the second UE is in the connected mode.

11. A mobile management entity in a cellular communications network configured to operate in accordance with a method according to claim 10.

12. A method of operation of a second mobile management entity in a cellular communications network, the method comprising:
when said second mobile management entity is serving a second User Equipment, UE, that is being used as a relay by a first UE or that may be used as the relay by the first UE, receiving a request from a first mobile management entity serving the first UE to one of forward a paging message to the first UE;
determining that the second UE is in an idle mode; and
if the received request is a request to forward the paging message to the first UE, sending a message to a radio access node serving the second UE, requesting said radio access node to page the second UE, in response to determining that the first UE and the second UE is in an idle mode, wherein the message to the radio access node serving the second UE is a paging message comprising identities of the second UE and of the first UE in a linked list.

13. A method according to claim 12, further comprising, after establishing a signaling connection between the second mobility management entity and the second UE, sending to the second UE a request to forward the paging message to the first UE.

* * * * *